United States Patent
Staal et al.

(10) Patent No.: US 12,092,555 B2
(45) Date of Patent: Sep. 17, 2024

(54) APPARATUS FOR DYNAMICALLY VARYING EXTRACTION DISTANCE BETWEEN EXTRACTION VOLUME AND SAMPLE SURFACE

(71) Applicant: Teledyne Instruments, Inc., Thousand Oaks, CA (US)

(72) Inventors: Benjamin Staal, Belgrade, MT (US); Stijn Van Malderen, Lokeren (BE); James Barbula, Livingston, MT (US)

(73) Assignee: TELEDYNE INSTRUMENTS, INC., Thousand Oaks, CA (US)

(\*) Notice: Subject to any disclaimer, the term of this patent is extended or adjusted under 35 U.S.C. 154(b) by 1305 days.

(21) Appl. No.: 16/452,039

(22) Filed: Jun. 25, 2019

(65) Prior Publication Data

US 2019/0391056 A1  Dec. 26, 2019

Related U.S. Application Data

(60) Provisional application No. 62/690,139, filed on Jun. 26, 2018.

(51) Int. Cl.
| | |
|---|---|
| *G01N 1/40* | (2006.01) |
| *G01N 1/04* | (2006.01) |
| *G01N 35/10* | (2006.01) |
| *G01N 35/00* | (2006.01) |

(52) U.S. Cl.
CPC .......... *G01N 1/04* (2013.01); *G01N 35/1095* (2013.01); *G01N 2001/045* (2013.01); *G01N 35/00693* (2013.01)

(58) Field of Classification Search
CPC . G01N 1/04; G01N 35/1095; G01N 2001/045
See application file for complete search history.

(56) References Cited

U.S. PATENT DOCUMENTS

| | | | |
|---|---|---|---|
| 2014/0287953 A1* | 9/2014 | Gunther | G01N 33/60 506/9 |
| 2016/0320269 A1* | 11/2016 | Hilliard | G01N 1/04 |
| 2017/0299522 A1 | 10/2017 | Vanhaecke et al. | |

FOREIGN PATENT DOCUMENTS

JP          H09-133617 A  *  5/1995

\* cited by examiner

*Primary Examiner* — Jennifer Wecker
*Assistant Examiner* — Michelle Adams
(74) *Attorney, Agent, or Firm* — K&L Gates LLP

(57) ABSTRACT

A system, apparatus configured to dynamically vary an extraction distance between an extraction volume and a sample surface through a probe assembly height adjustment apparatus operably coupled to a motor in which a processor can move the probe assembly height adjustment apparatus to maintain the extraction distance, or tune the extraction distance to optimize sampling performance. Methods for calibrating, tuning an extraction distance between an extraction volume and a sample surface.

12 Claims, 25 Drawing Sheets

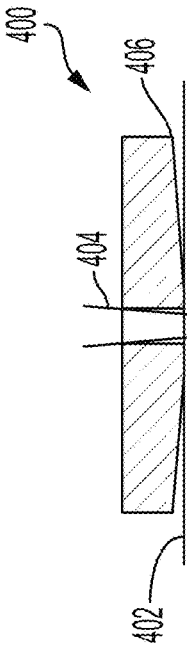
Fig. 14A
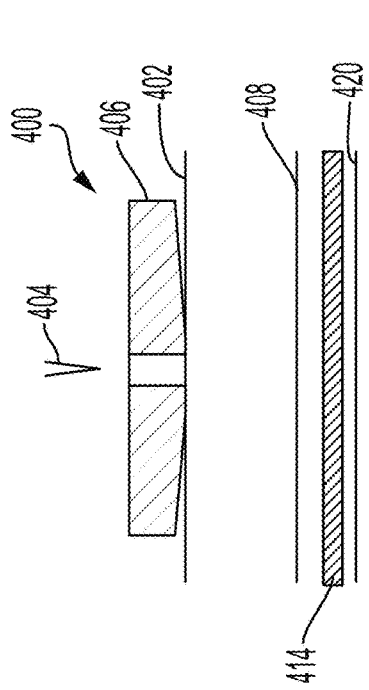
Fig. 14B
Fig. 14C
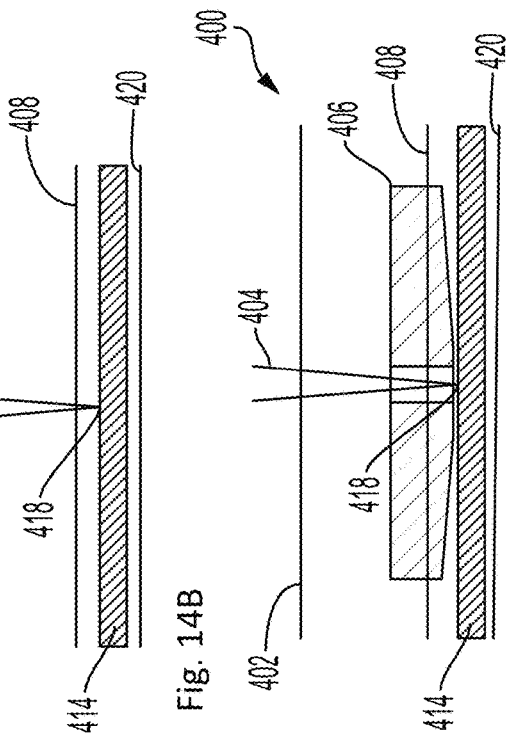
Fig. 14D
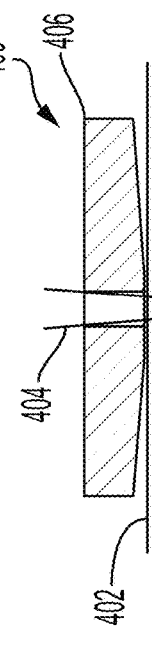
Fig. 14E
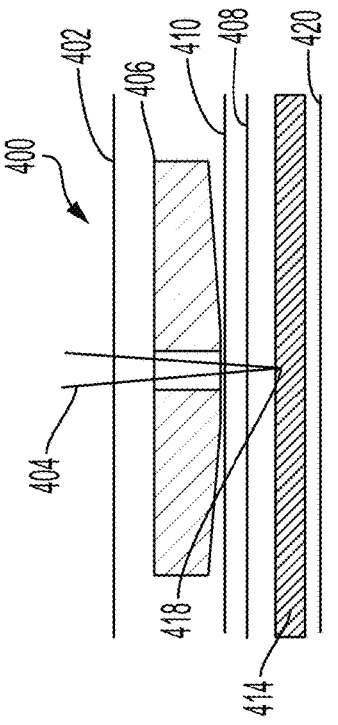
Fig. 14F
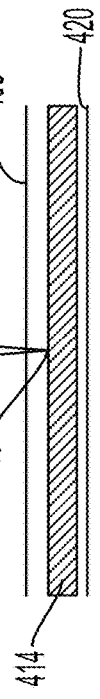

Spot size: 5 micron
Rep rate: 125 Hz
Dwell time 238U: 8 ms
Dosage: 1
Scan speed 625 micron/s
Lase time: 33 min. Took > 1.5 hour due to stage repositioning and Z-prime retraction. But we should be able to get this down to <40 min or so if Chromium is fixed.
Data processing: unfiltered image, processed with HDIP

APPARATUS FOR DYNAMICALLY VARYING EXTRACTION DISTANCE BETWEEN EXTRACTION VOLUME AND SAMPLE SURFACE

CROSS-REFERENCE TO RELATED APPLICATIONS

This non-provisional application claims the benefit under 35 U.S.C. § 119(e) to U.S. Provisional Patent Application Ser. No. 62/690,139, entitled DYNAMICALLY VARIABLE EXTRACTION DISTANCE BETWEEN EXTRACTION VOLUME AND SAMPLE SURFACE, filed Jun. 26, 2018, which is incorporated herein by reference in its entirety.

BACKGROUND

Generally, laser ablation is a technique for removing material from a sample, such as a solid sample, by irradiating the surface of the sample with a beam of radiation (e.g., a laser beam). The sample is often positioned within a confined space, referred to as an ablation chamber or cell. Upon radiation, the targeted material is energized or vaporized by the absorbed laser energy, inducing the evaporation, ejection, or sublimation of a portion of the targeted material, creating an aerosol (solid and/or liquid particles and/or vapor suspended in a carrier gas, e.g., helium gas). Thus, laser ablation may be greatly affected by the nature of the material and its ability to absorb energy. At high laser flux, the material is typically converted to plasma.

Ablation as a means of sample introduction for ICP-MS and ICP-OES permits the direct analysis of solid materials. LA-ICP-MS offers spatially resolved information for large sample areas at a lateral resolution in the order of a few and high detection power, while retaining a quantitative character in a wide concentration range. The ability to characterize the distribution of major, minor and trace nuclides has led to applications in a wide variety of fields, e.g., in geology, mineralogy, archaeology, forensics, materials research, environmental studies, biochemistry, and biology. A probe assembly may be included for the collection of an aerosol generated by ablation and the efficient transport of this aerosol towards a probe outlet, e.g., towards an analysis system. The probe may be an externally mountable tube cell; however, other types of sample extraction devices or probes can be utilized. The tube cell may be of similar dimension as a conduit, and aerosol ejection occurs predominantly in a direction orthogonal or parallel to the carrier gas stream.

SUMMARY

The present disclosure is directed to a system, method, and apparatus configured to dynamically vary the extraction distance between the extraction volume and the sample surface.

In various embodiments, an apparatus for dynamically varying an extraction distance between a extraction volume and a sample surface is disclosed. The apparatus includes a motor, a height adjustable piston operably coupled to the motor, an analyte extraction device coupled to the height adjustable piston, a processor coupled to the motor, and a memory coupled to the processor, the memory storing machine executable instructions that, when executed by the processor, cause the processor to move the analyte extraction device by a combination of the motor and the height adjustable piston. During an analysis of a sample, the analyte extraction device is dynamically adjusted to optimize sampling performance.

In various embodiments, a method for calibrating a device for dynamically varying an extraction distance between an extraction volume and a sample surface is disclosed. The method includes homing a first Z axis and a second Z' axis, loading a sample or calibration target into a sample chamber, moving the first Z axis until an image of the sample or calibration target is in focus, moving the second Z' axis downward slowly to a position until the image of the sample or calibration target starts to become out of focus, moving the second Z' axis upward until the image of the sample or calibration target is back in focus, and subtracting the second Z' axis position from a position of the sample.

In various embodiments, a method for tuning a device for dynamically varying an extraction distance between an extraction volume and a sample surface is disclosed. The method includes loading a sample into a sample chamber, placing a line scan of a predetermined length across the sample, initiating a scan, adjusting a flow rate of gases entering the sample chamber, and adjusting a position of a Z' axis.

In various embodiments, a method for running a scan sequence of a device for dynamically varying an extraction distance between an extraction volume and a sample surface is disclosed. the method includes moving X, Y, Z stages to a starting position of a scan, moving a Z' axis down to an optimal extraction position, firing a laser at selected fluence, and moving the Z' axis back to a home position.

In various embodiments, a system for dynamically varying an extraction distance between a extraction volume and a sample surface is disclosed. The system includes a device and a control system. The device includes a motor, a height adjustable piston operably coupled to the motor, and an analyte extraction device movably coupled to the height adjustable piston. The control system includes a processor operably coupled to the motor and a memory operably coupled to the processor. The memory includes instructions that, when executed by the processor, cause the processor to move X, Y, Z stages to a starting position of a scan, move a Z' axis down to an optimal extraction position, fire a laser at selected fluence, and move the Z' axis back to a home position.

The advantages discussed herein may be found in one, or some, and perhaps not all of the embodiments disclosed herein. Additional features and advantages are described herein, and will be apparent from the following Detailed Description and the figures.

BRIEF DESCRIPTION OF THE DRAWINGS

FIG. 14A-F is an example block diagram of calibrating a device for dynamically varying the extraction distance between the extraction volume and the sample surface over time, according to one aspect of the present disclosure.

DETAILED DESCRIPTION

The present disclosure relates in general to a method, system, and apparatus configured to dynamically vary the extraction distance between the extraction volume and the sample surface. Typically, a tube cell may be in contact with a sample that is to be used in laser ablation. However, direct contact with the sample may cause damage to the sample, may cause the sample to move where it is required that the sample remain stationary (limiting the area of the sample to be imaged), and may provide difficulty in positioning the cell over the desired area of interest. Thus, hovering a cell above a sample may mitigate some of these issues. However, generally, high spatial resolution elemental mapping and/or ultra-fast sampling is an emerging application in the field of laser ablation. It may typically provide a more detailed analysis than previously possible, but the performance of ultra-fast sampling systems is significantly affected by the distance between the sample and the extraction device (or analyte extraction device). An analyte is generally a substance whose chemical constituents are being identified and measured. Typically, ultra-fast sampling systems are those that can deliver a full pulse of analyte at 10% of maximum intensity in less than 10 milliseconds, or <10 ms Full Width at One-tenth Maximum (FW0.1M). Although traditional sample chambers, such as HelEx™, also may be affected by variations in the sample to extraction device spacing, the magnitude of impact may be less on traditional sample chambers than on ultra-fast sampling systems. Thus, in ultra-fast sampling systems, the separation between the extraction device and a sample surface may need to be precisely controlled to provide optimal performance of the sample extraction system.

However, samples used typically may range in size and have variable topology. Furthermore, the way that the samples are retained in the holder can cause the sample surface to tilt. Thus, it may be desirable for a device to be capable of optimizing the spacing between the extraction device and the sample in order to ensure that extraction performance is consistently optimal.

The provided systems and methods dynamically vary the extraction distance between an extraction volume and a sample surface. This provides consistent spacing across a single sample, from sample to sample within the same sample holder and from one load of the holder to the next. Due to inherent variations in samples, this may be achieved by dynamically adjusting and controlling the spacing from the sample to the extraction device by a computer. Thus, the spacing can be adjusted to provide optimal sampling performance and to ensure that the spacing is consistent between samples. As described below, the disclosure may be incorporated into a Cobalt sample chamber, but any type of sample chamber may be used and incorporate the below descriptions.

Figure 1:
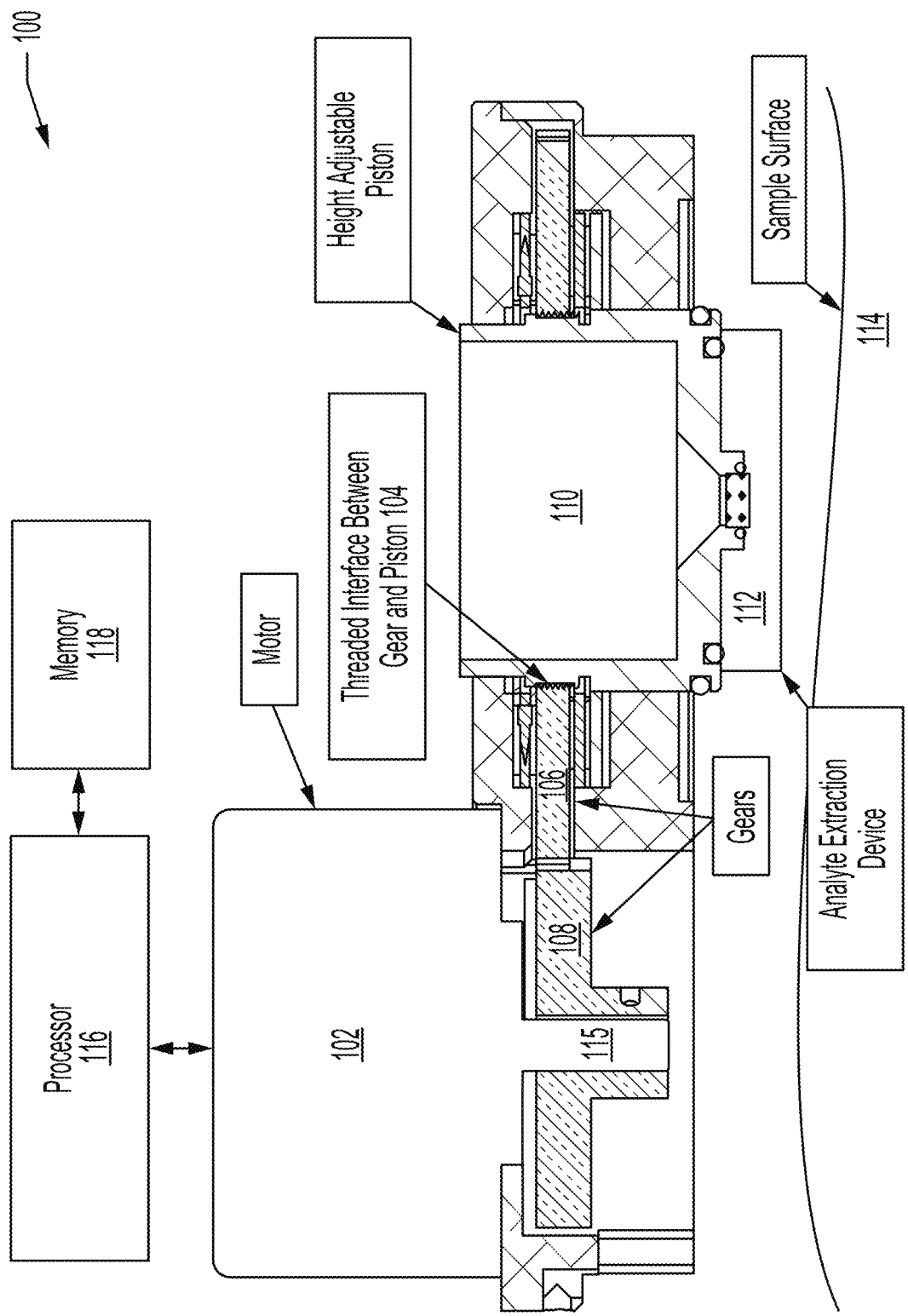
FIG. 1 is an example diagram of a device for dynamically varying the extraction distance between the extraction volume and the sample surface, according to one aspect of the present disclosure.
Figure 2:
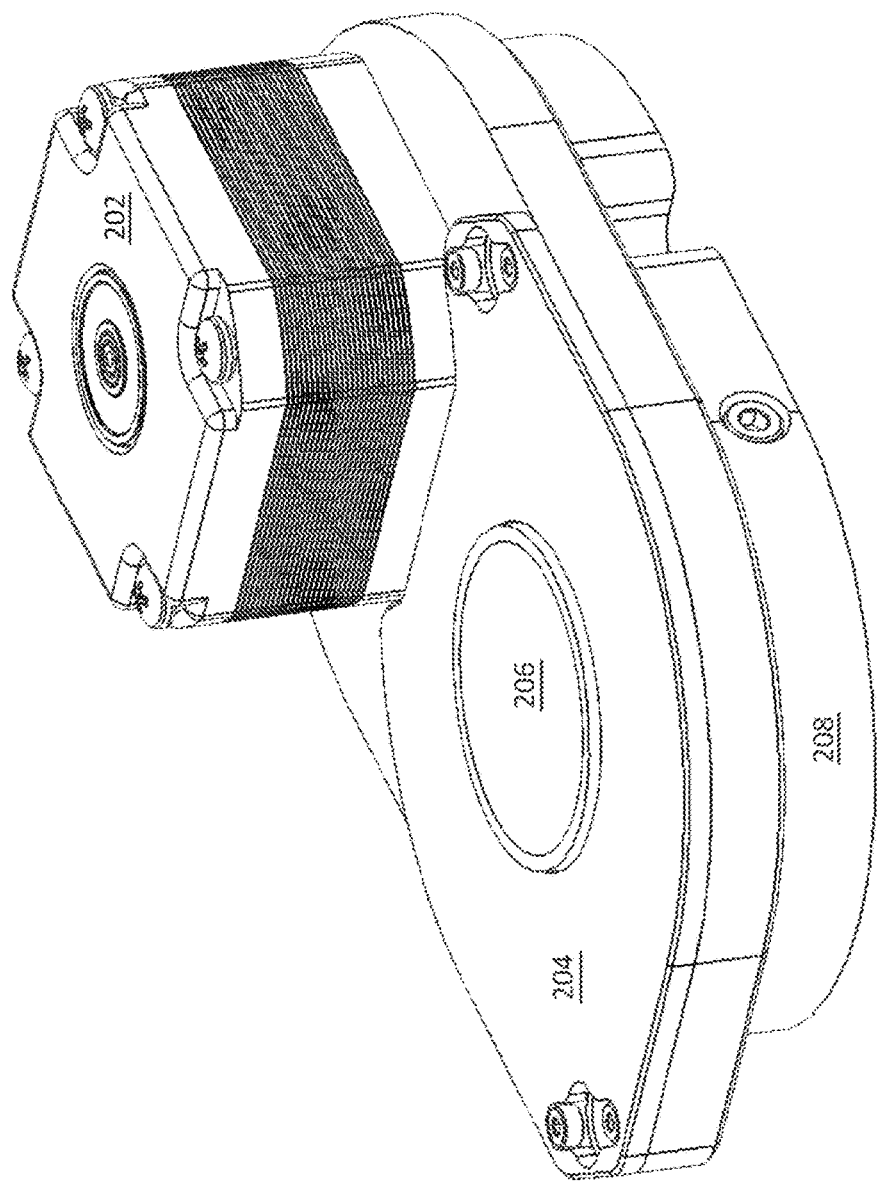
FIG. 2 is an example of a perspective view of a device for dynamically varying the extraction distance between the extraction volume and the sample surface, according to one aspect of the present disclosure.
Figure 3:
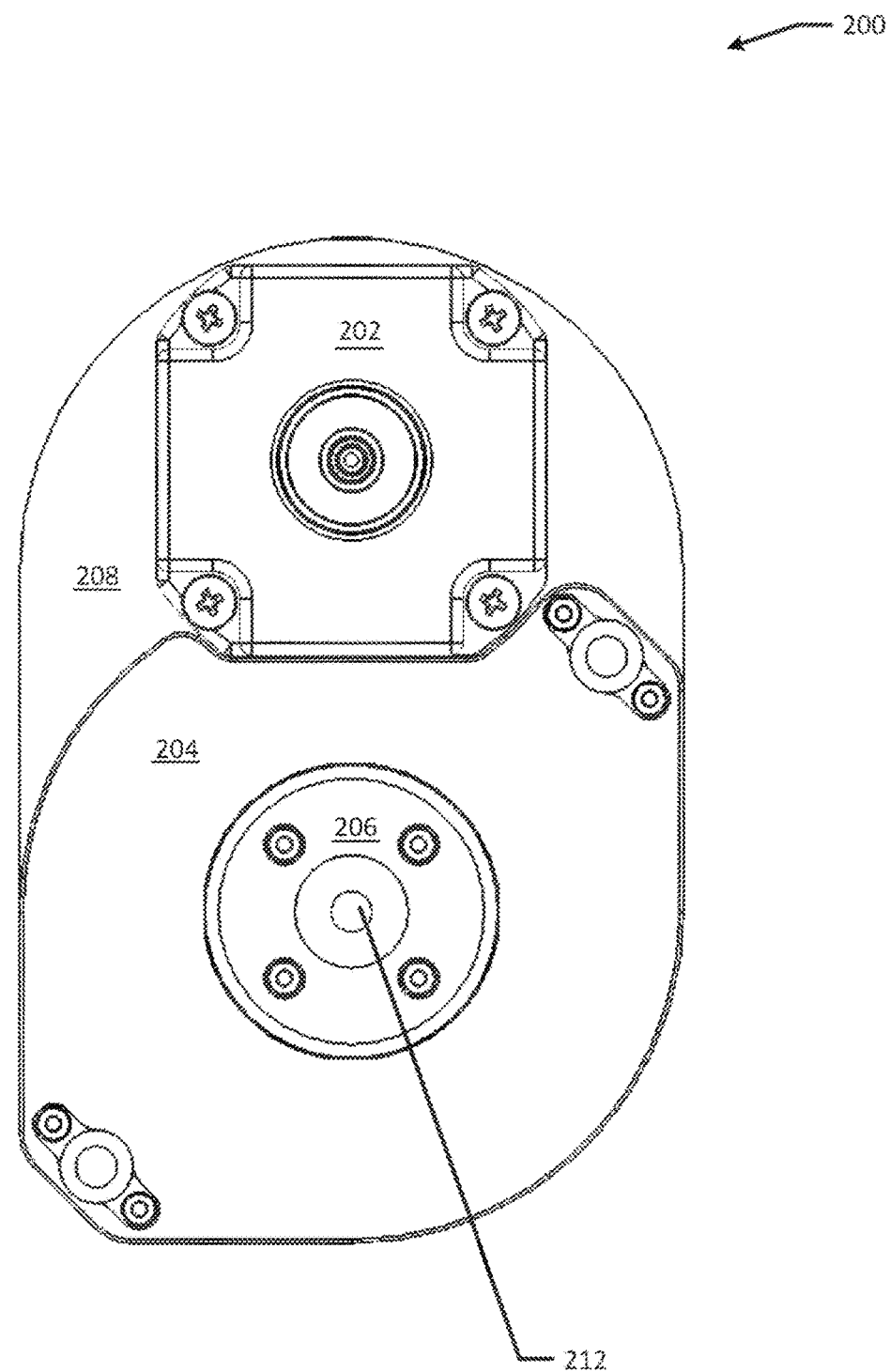
FIG. 3 is an example top-down view of a device for dynamically varying the extraction distance between the extraction volume and the sample surface, according to one aspect of the present disclosure.
Figure 4:
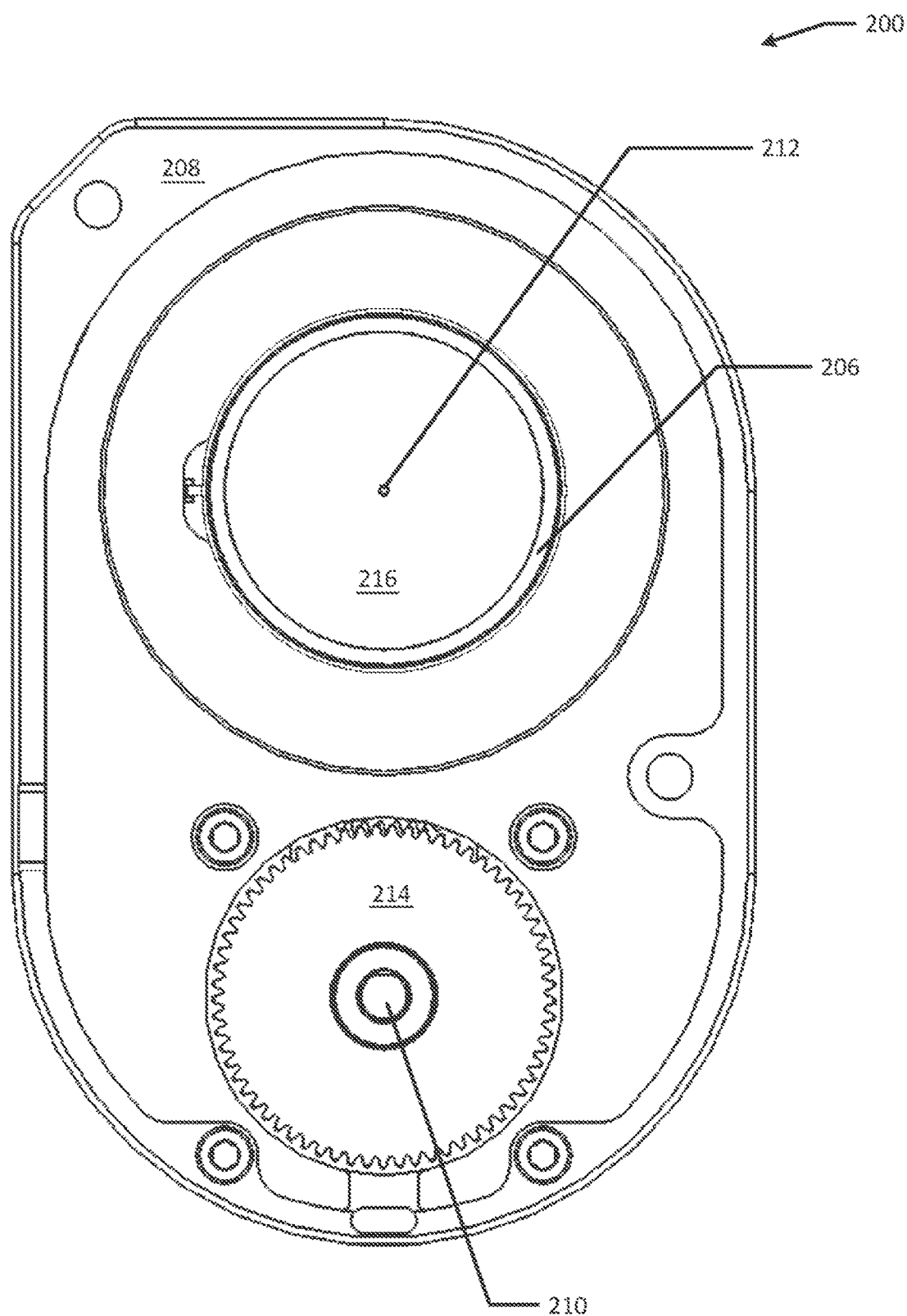
FIG. 4 is an example bottom-up view of a device for dynamically varying the extraction distance between the extraction volume and the sample surface, according to one aspect of the present disclosure.
Figure 5:
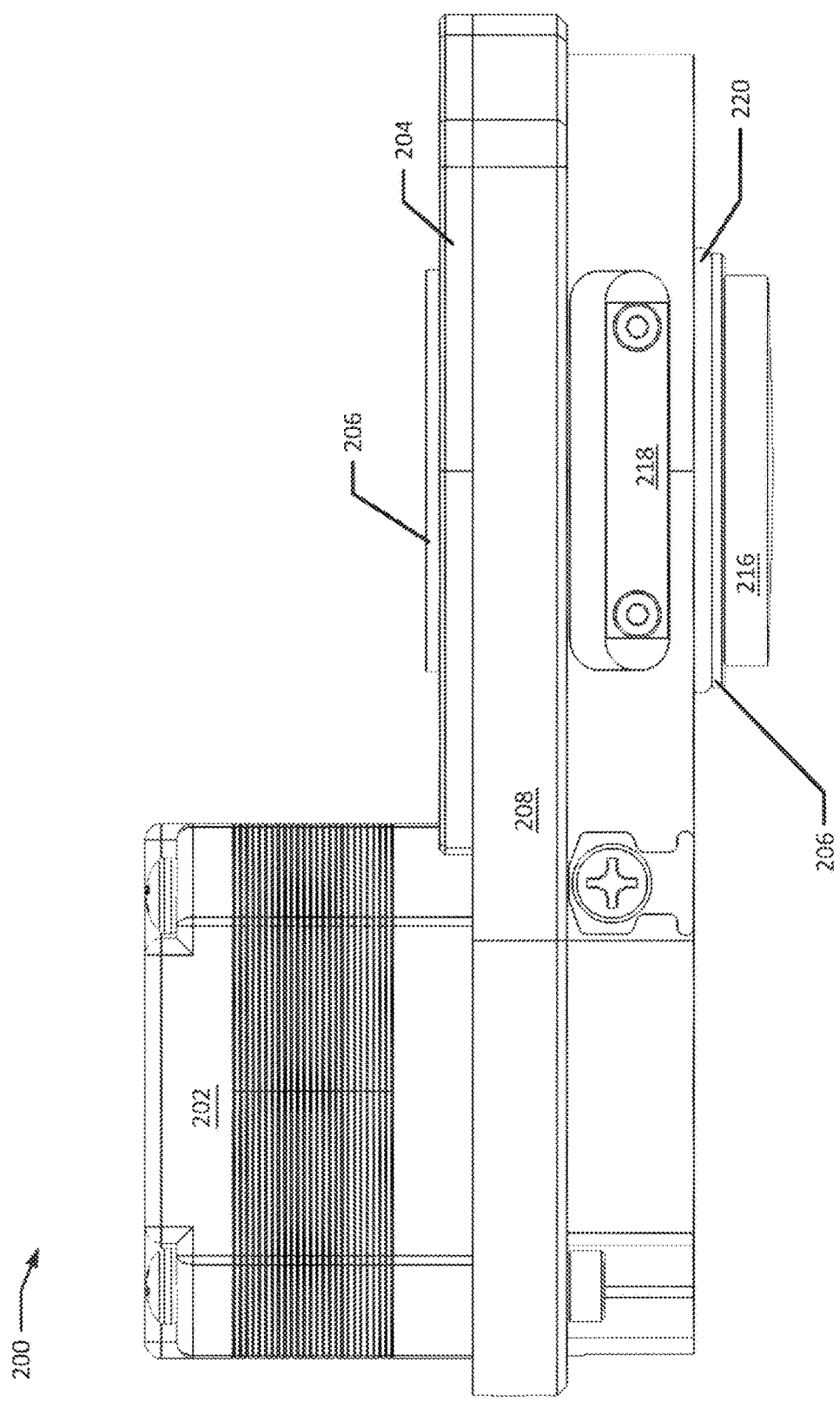
FIG. 5 is an example side view of a device for dynamically varying the extraction distance between the extraction volume and the sample surface, according to one aspect of the present disclosure.
Figure 6:
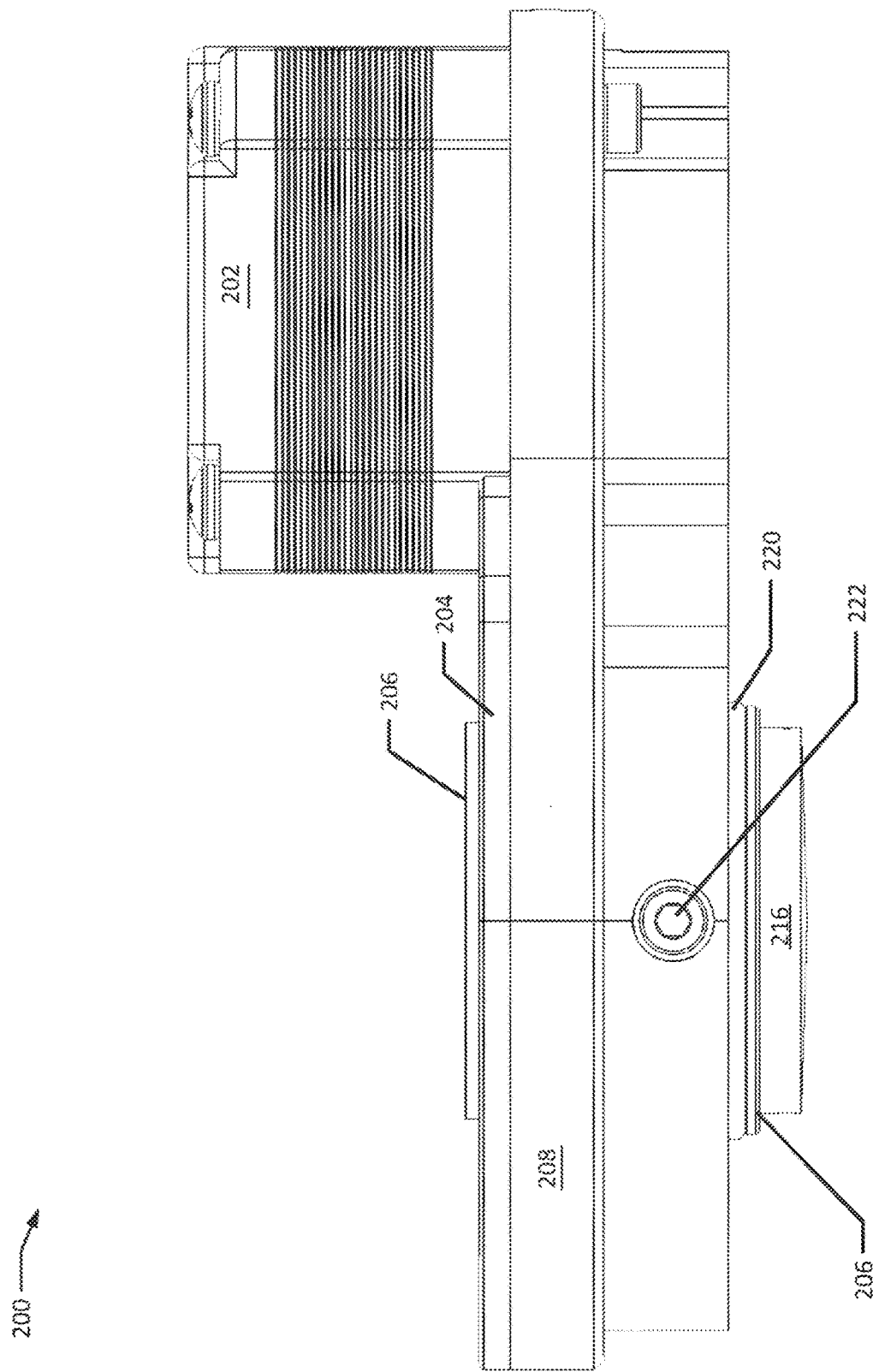
FIG. 6 is an example side view of a device for dynamically varying the extraction distance between the extraction volume and the sample surface, according to one aspect of the present disclosure.
Figure 7:
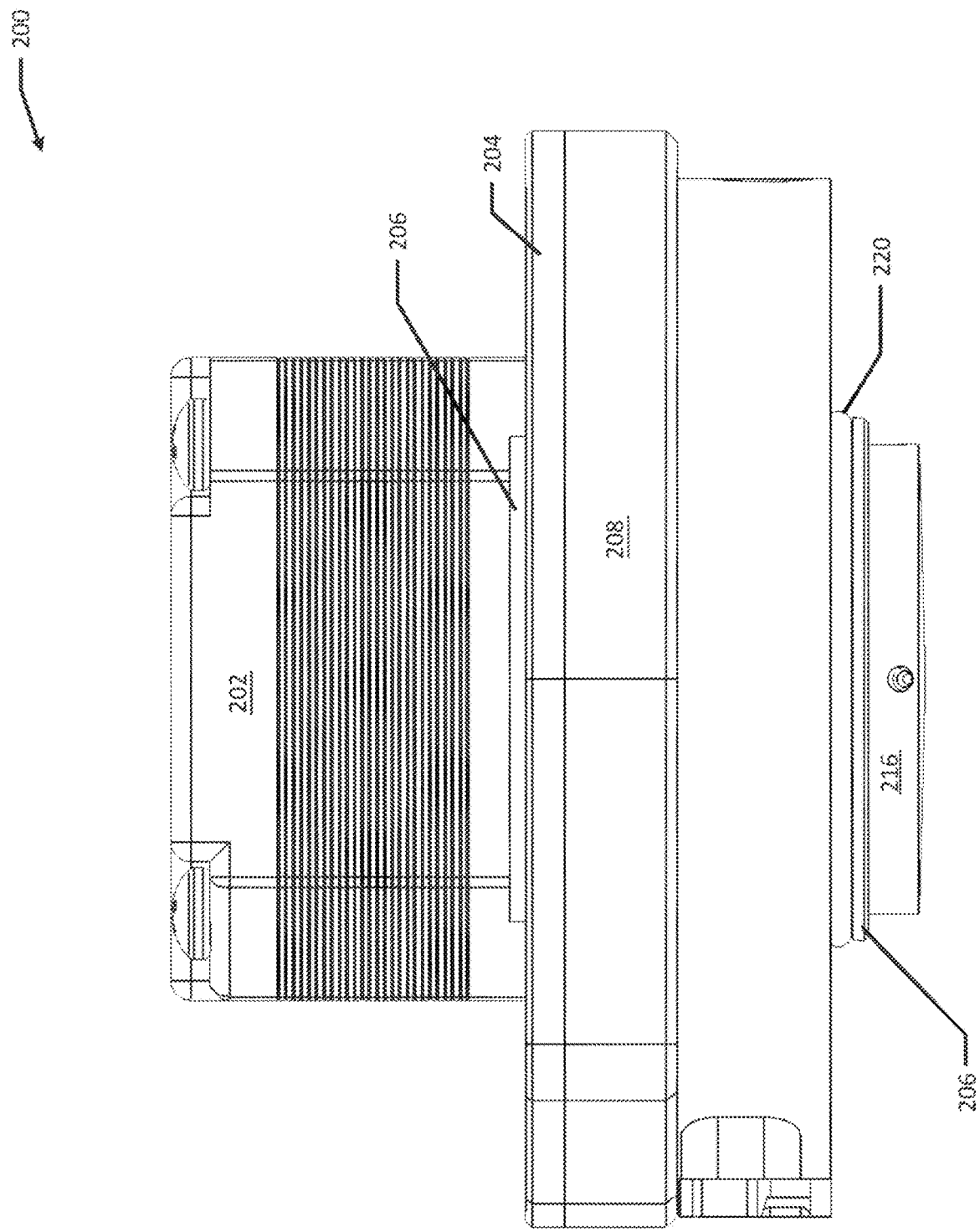
FIG. 7 is an example front view of a device for dynamically varying the extraction distance between the extraction volume and the sample surface, according to one aspect of the present disclosure.
Figure 8:
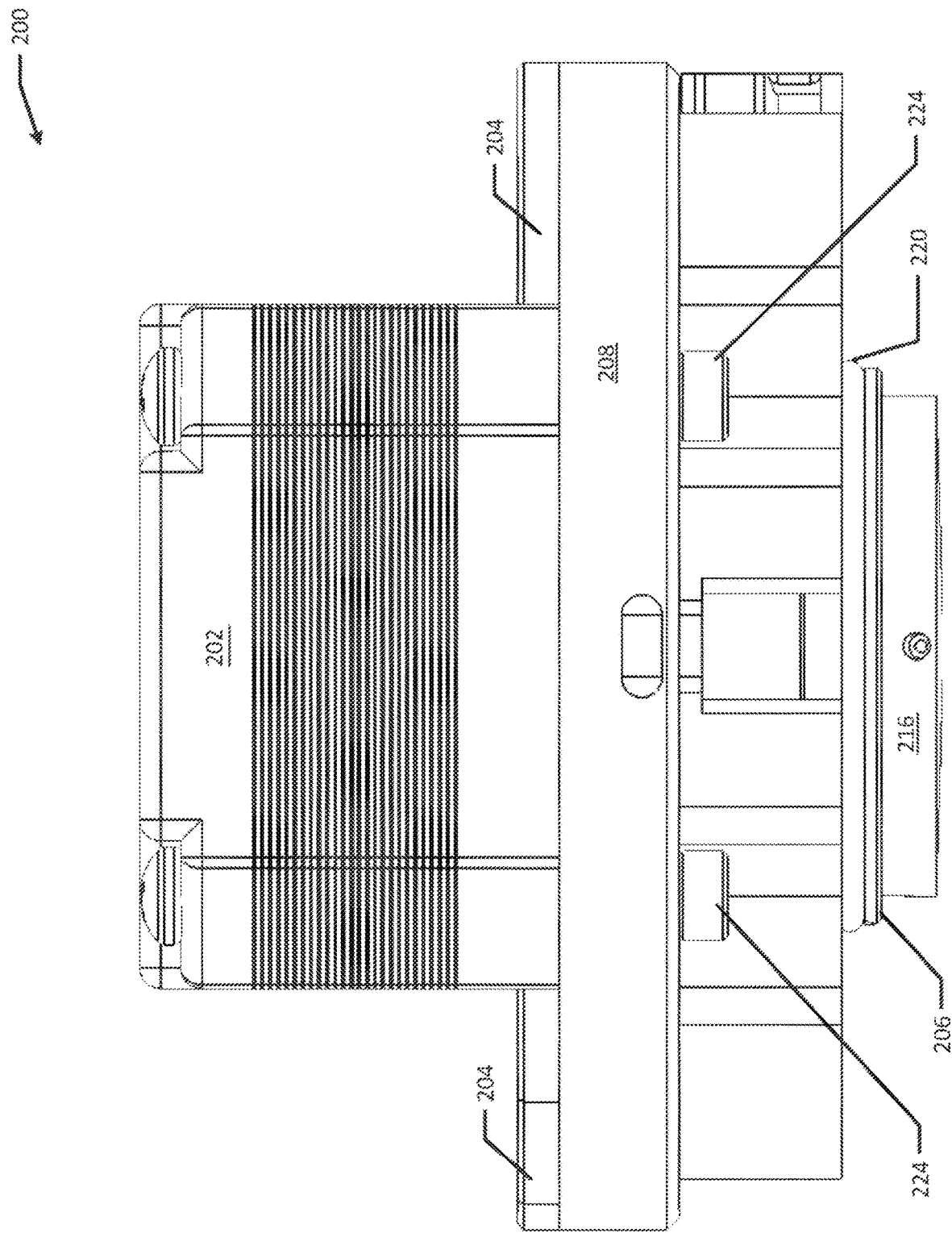
FIG. 8 is an example back view of a device for dynamically varying the extraction distance between the extraction volume and the sample surface, according to one aspect of the present disclosure.
Figure 9:
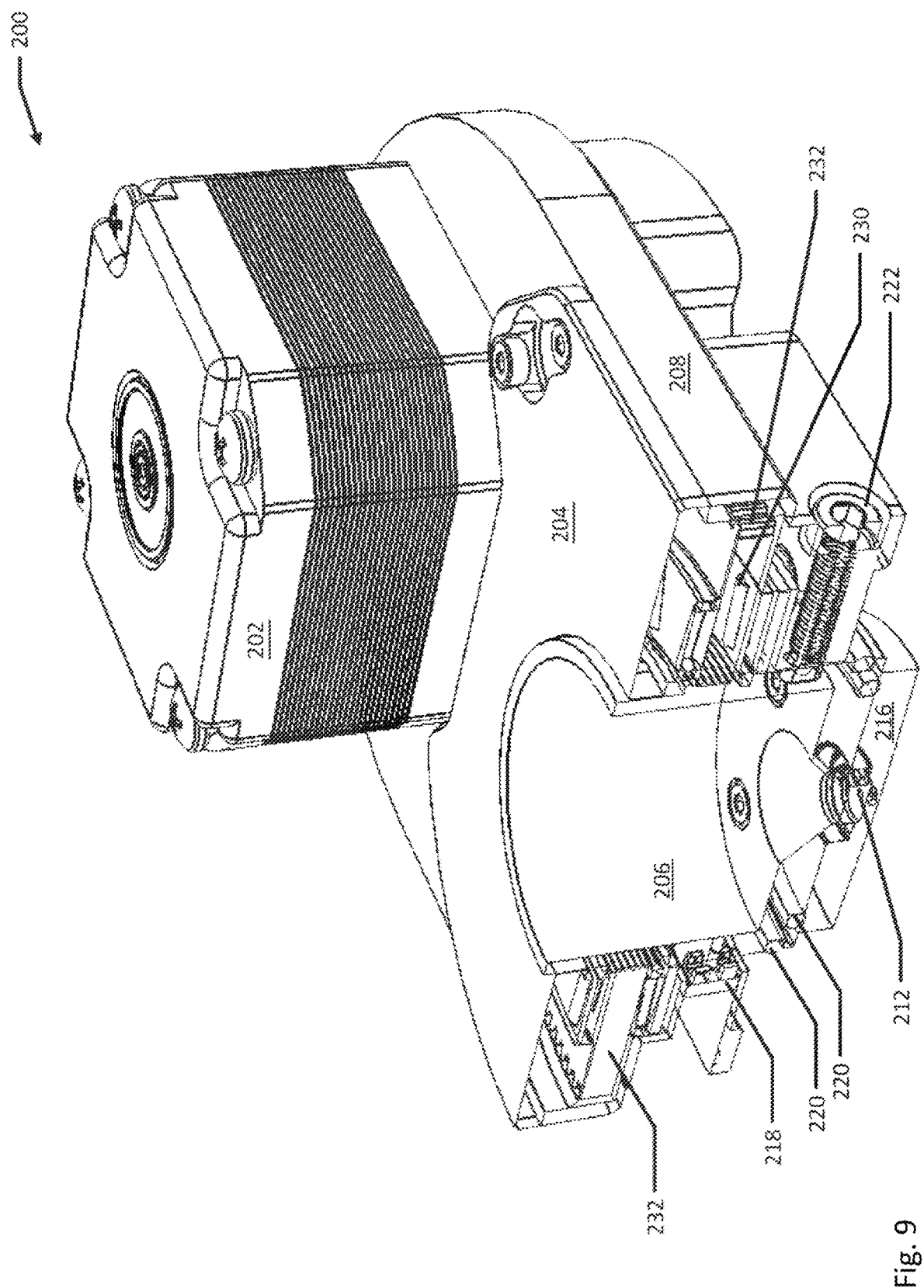
FIG. 9 is an example cross-section of a device for dynamically varying the extraction distance between the extraction volume and the sample surface, according to one aspect of the present disclosure.

FIG. 1 is an example diagram of a device 100 for dynamically varying the extraction distance between the extraction volume and the sample surface, according to one aspect of the present disclosure. The device 100 may include a motor 102, a gear 106, a gear 108, a height adjustable piston 110, a threaded interface 104 between the gear 106 and the piston 110, and an analyte extraction device 112. Also depicted in FIG. 1 may be a sample surface 114. The analyte extraction device 112 may be moved by the combination of gears (gears 106 and 108) and the threaded interface 104. The rotational motion of the motor shaft 115 may be translated to vertical linear motion of the analyte extraction device 112. In the example, the distance between the sample surface 114 and bottom of the analyte extraction device 112 may be calibrated and fine tuned as described below. During an analysis, the analyte extraction device 112 may move vertically to maintain a defined distance from the sample surface 114.

In one example, the motor 102, as well as other mechanisms for the device 100, such as a camera or a microscope, may be controlled by a control system, algorithms, software, code, etc. The software may be implemented on a computer, CPU, and/or processor 116 coupled to a memory 118, or any combination thereof, that may include a storage unit or memory unit directly within or communicably coupled to the computer, CPU or processor. The computer, CPU, processor, etc. may receive a variety of inputs from, and provide outputs to, a user. The outputs to the user can include information about the device, such as a position of the analyte extraction device 112. Further, the processor 116 may receive a variety of inputs from, or provide outputs to, any component of device 100. The memory 118 stores machine executable instructions that when executed by the processor 116, cause the processor 116 to move the analyte extraction device 112 by a combination of gears (gears 106 and 108) and the threaded interface 104. The rotational motion of the motor shaft 115 may be translated to vertical linear motion of the analyte extraction device 112. In one example, the distance between the sample surface 114 and bottom of the analyte extraction device 112 may be calibrated and fine tuned as described below. During an analysis, the analyte extraction device 112 may move vertically to maintain a defined distance from the sample surface 114.

As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system connected to and integrating device. In an example, all of the disclosed methods and procedures described herein can be implemented by the one or more processors. Further, the system controlling operations defined in FIG. 1 may be distributed over multiple processors, memories, and networks.

The disclosed device 100 may allow the analyte extraction device's 112 position above the sample surface 114 to be dynamically adjusted to optimize sampling performance. This height above the sample surface 114 may remain consistent across samples, even with varying sample topology. This may enable the performance of the device 100 to be consistent regardless of the sample or how it may have been loaded into the sample holder.

The sample holder may be a regular sample holder, a modified sample holder to fit specific dimensions, or a cryo-holder. Further the device 100 may hold more than one sample. Any number of samples may be held in device 100. Magnets may be included in order to position, maintain, secure, or align the samples within the holder, and/or to position, maintain, secure, or align the sample holder within the device 100. Even further, the holders and/or sample drawers of device 100 may include marks or markings in order to help position the samples. In an example, the device 100 may include a single sample holder that may have a number of inserts for slides. For example, the sample holder may hold 2 or 3 slides. In an alternate example, the device 100 may include more than one sample holder. In an example, the sample holder may be a deep well holder. In an alternate example, the sample holder may be a standard holder. Further, in an example, the sample drawer and/or the sample holder may include thin guides to guide the slides into position. In an example, the sample drawer may be motorized for ease of extraction. In an alternate embodiment, the sample drawer may include an ejection mechanism for ease of extraction.

FIGS. 2 to 10, 26, and 27 disclose various example views of a device for dynamically varying the extraction distance between the extraction volume and the sample surface, according to one aspect of the present disclosure. FIGS. 2 to 10, 26, and 27 may include a flat on shaft 210. The flat on shaft 210 may be part of a motor 202. Further, FIGS. 2 to 10, 26, and 27 may include a tube cell piston 206, an adjustable piston cover 204, an adjustable housing 208, a tube cell 216, O-rings 220, a piston clocking screw 222, and screws 224. A window 212 may be located within the tube cell piston 206 and/or tube cell 216. A gear 214 may be located at the bottom of the flat on shaft 210. A limit switch board 218 may be located within housing 208 for limiting travel of the tube cell piston 206 relative to the tube cell 216. A limit switch may be a switch operated by the motion of a machine part. The example device may include Hall Effect sensors, magnets, sample drawers, spacers, doors, airlocks, sample chambers, position sensors, encoders, screws, cable ties, etc. The components described herein should not limit the components depicted in the figures, as more components may be disclosed in the figures than described. Further, all components described herein or depicted in FIGS. 2 to 8, 26, and 27 may be either electrically or mechanically coupled and/or in electrical or mechanical communication with each other.

FIGS. 9, 10, 26, and 27 disclose example cross-sectional views of a device 200 for dynamically varying the extraction distance between the extraction volume and the sample surface, according to one aspect of the present disclosure. In addition to the features described above, FIG. 9 may include a spur gear 232 and a thrust needle-roller bearing 230. The spur gear 232 can include outer threads configured to mesh with the gear 214 and inner threads configured to mesh with threads on the tube cell piston 206.

In operation, the motor 202 can be configured to rotate the flat on shaft 210, which causes rotation of gear 214. Rotation of gear 214 can cause rotation of the spur gear 232 as gear 214 is intermeshed with the outer threads of the spur gear 232. In addition, rotation of spur gear 232 can cause the vertical displacement of the tube cell piston 206 as the inner threads of spur gear 232 are intermeshed with the threads of the tube cell piston 206. Vertical displacement of the tube cell piston 206 allows for adjustment between the tube cell piston 206 and the tube cell 216. Rotation of the flat on shaft 210 in a first direction, as an example, can cause the tube cell piston 206 to vertically displace towards the tube cell 206. Rotation of the flat on shaft 210 in a second direction, as another example, can cause the tube cell piston 206 to vertically displace away from the tube cell 206.

Figure 10:
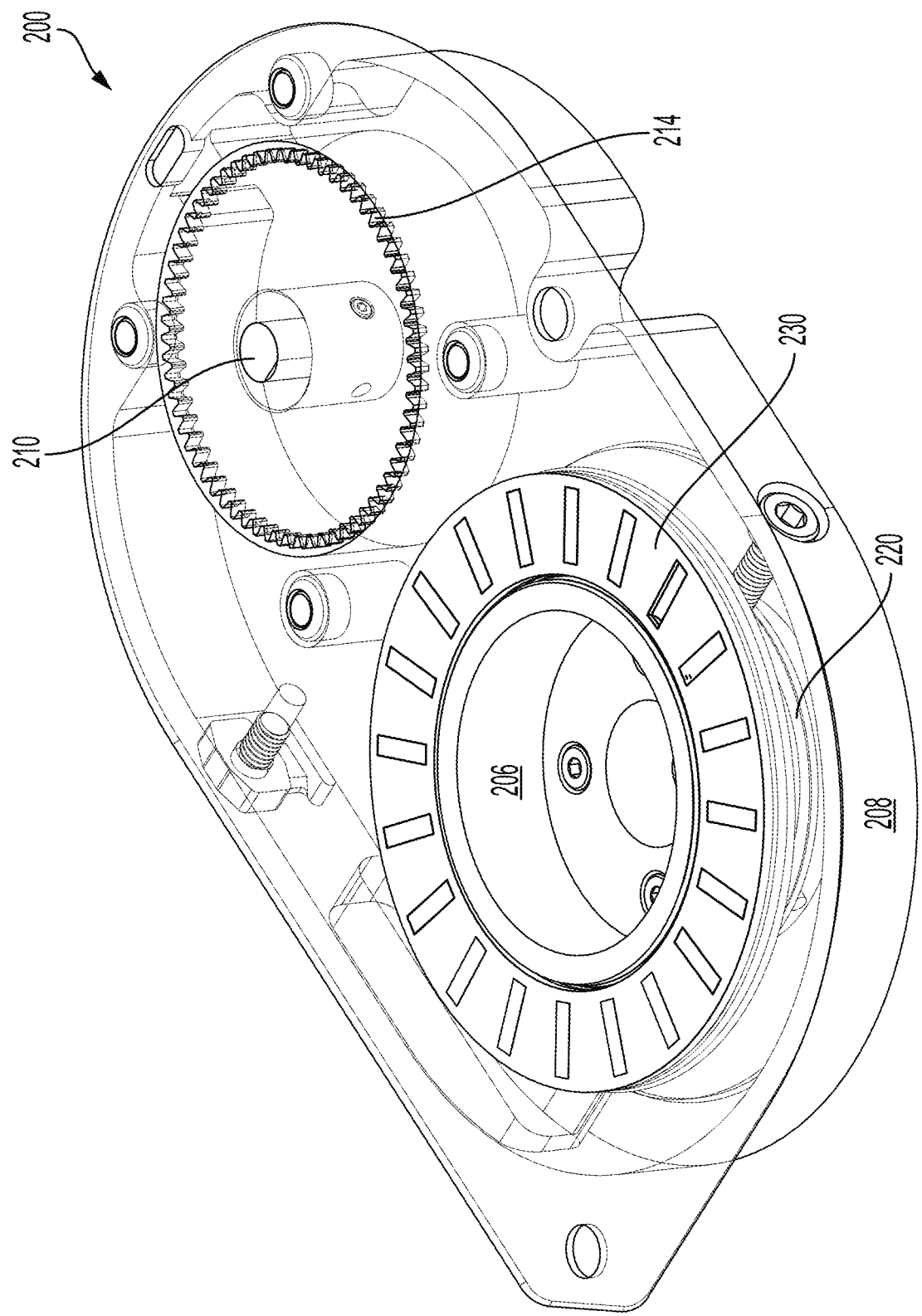
FIG. 10 is an example cross-section of a device for dynamically varying the extraction distance between the extraction volume and the sample surface, according to one aspect of the present disclosure.

FIG. 10 may depict a thrust needle roller bearing 230. Not depicted in FIG. 10 may be a spur gear, such as spur gear 232 that may be situated on top of, outside the rim of, or below thrust needle roller bearing 230. Additionally not depicted may be springs located below thrust needle roller bearing 230. Additionally, a gear 214 may be depicted in FIG. 10. In an alternative embodiment, gear 214 may be part of the housing 208 and may not be a separate gear.

Figure 11:
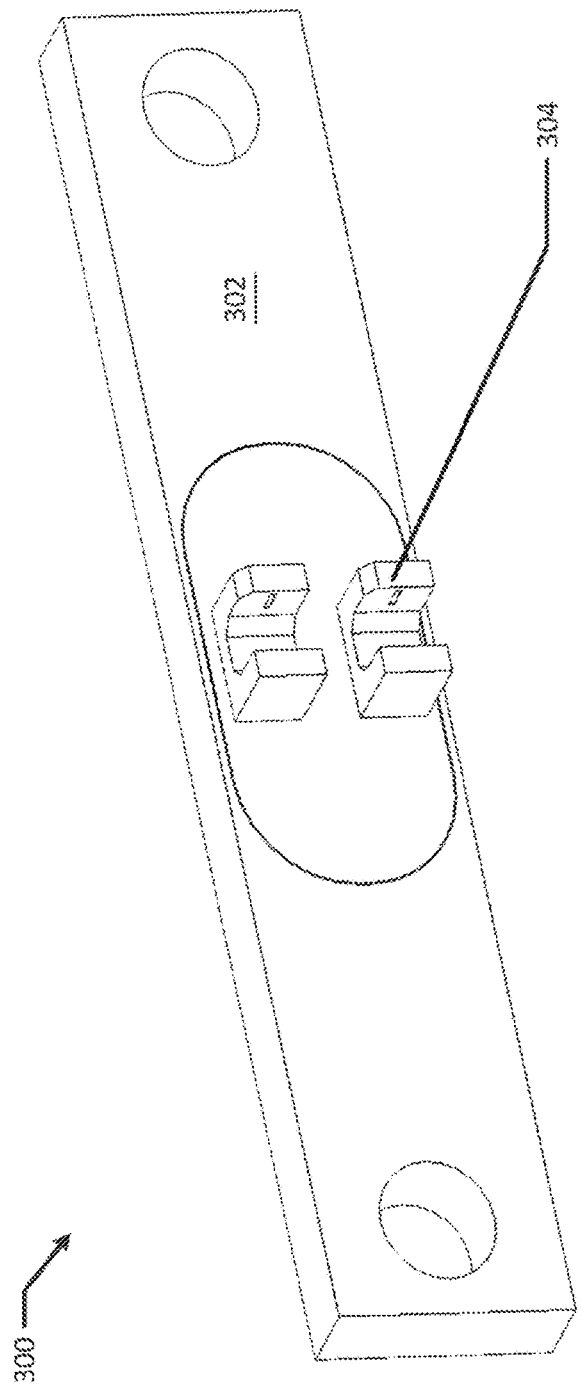
FIG. 11 is an example limit switch board design of a device for dynamically varying the extraction distance between the extraction volume and the sample surface, according to one aspect of the present disclosure.
Figure 12:
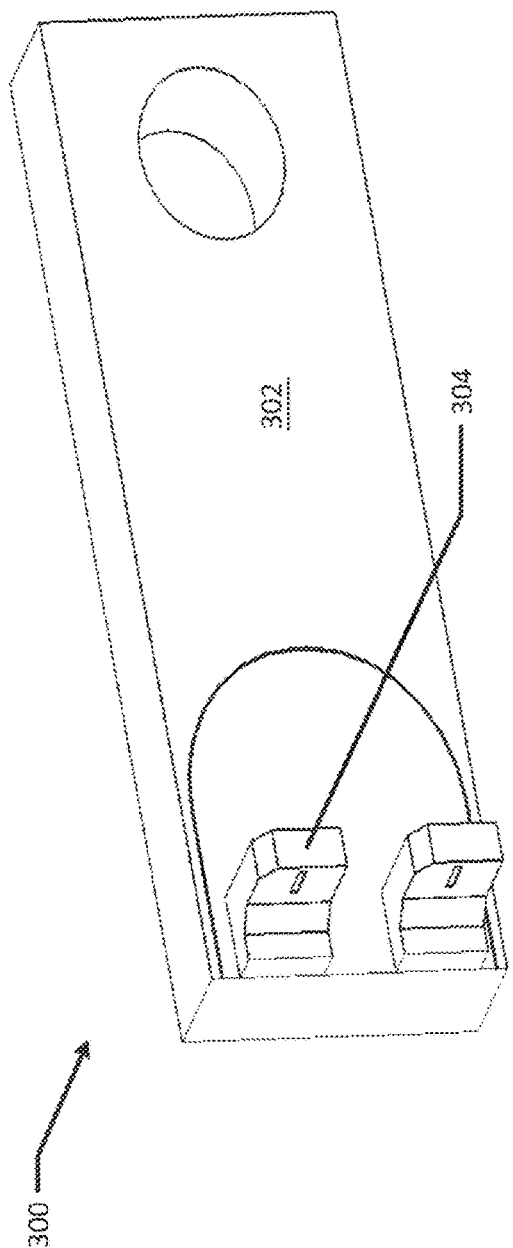
FIG. 12 is an example cross-section of the limit switch board design, according to an example of the present disclosure.

FIG. 11 discloses an example limit switch board 300 of a device for dynamically varying the extraction distance between the extraction volume and the sample surface, according to one aspect of the present disclosure. FIG. 12 may depict an example cross section of the limit switch board 300 of FIG. 11. The limit switch board 300 include a body 302 and two phototransistor output, compact transmissive photointerrupters 304.

Figure 13:
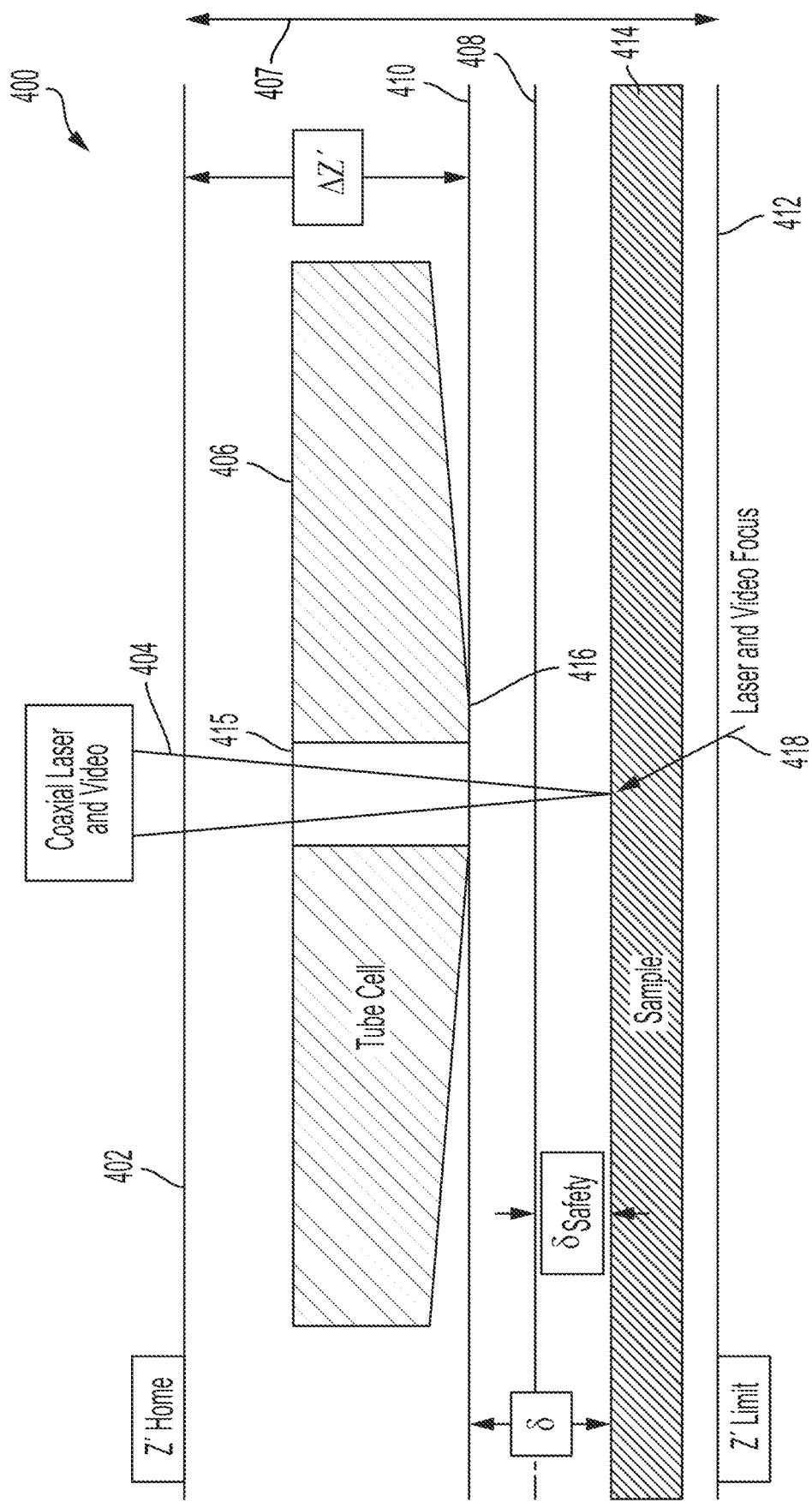
FIG. 13 is an example block diagram of a device for dynamically varying the extraction distance between the extraction volume and the sample surface, according to one aspect of the present disclosure.

FIG. 13 depicts an example block diagram 400 of a device for dynamically varying the extraction distance between the extraction volume and the sample surface, according to one aspect of the present disclosure. FIG. 13 may include a Z' home position 402, safety distance ($\delta_{Safety}$) 408, a Z' limit 412, and a tuned position (or position of a tube cell 406 over the sample) ($\delta$) 410. FIG. 13 further may depict a sample 414 and a coaxial laser and video beam 404. The coaxial laser and video beam 404 may land at a point on the sample 414 called the laser and video focus 418.

As the tube cell 406 may be adjusted along the Z axis 407, the motorized assembly that moves the tube cell may be discussed as Z-Prime or Z' Axis. The depicted example 400 may include a line reference known as Z' home 402. This Z' home line 402 may indicate the tube cell's 406 position when at rest or at default. The position of Z' home may be far enough away from the sample 414 in order to prevent any contact or interference, and may provide maximum clearance between the samples 414 and the tube cell 406 to avoid any collisions.

The tube cell 406 may require that the distance between the sample 414 and the tube cell inlet 415 be in the range of 100-200 μm for optimal performance. The exact distance between the sample 414 and the tube cell inlet 415 may depend on many different factors, including gas flowrate, such as helium flowrate, sample type, and laser fluence. As used herein, laser fluence refers to the time-integrated flux of radiation of laser light, where the fluence of a laser pulse is the optical energy delivered per unit area. Therefore, it may be advantageous to be able adjust the distance by a laser ablation software (e.g., Chromium™) so that a user may tune the distance for optimal performance, similar to how a gas flowrate may be tuned when using the HelEx™ sample chamber.

It may be possible to relate the positions of the objective lens (mounted with the rest of the laser/video optics on the Z axis stage), the inlet of the tube cell 415 and the sample 414. The Z' axis may be calibrated in order to account for the following assumptions: (1) the focal length of a particular objective lens may be constant, thus the distance between the sample 414 and the objective lens when a video is in focus may be constant; (2) the Z' axis may have a large enough travel range to be able move the tube cell 406 until it may come in contact with the sample 414 when the sample 414 may be properly mounted in a sample drawer. Also, the tube cell 406 may be able to move the sample 414 downward enough that a video image may be noticeably out of focus when the image was previously in focus. This contact and movement of the sample 414 or calibration target may be used for the calibration process. Similarly, the Z' axis may have enough travel space in the opposite direction to position the tube-cell 406 so that it may not collide with the sample 414 or any part of the sample drawer; (3) the sample drawer may be level in the plane normal (perpendicular) to the laser and video axis within a specified tolerance. Similarly, the sample 414, when properly mounted in the sample drawer, may have its top surface within a specified tolerance. Together, these two requirements place a limit on the possible variation in sample heights between two adjacent samples. The variation in adjacent sample heights may be denoted Δs. The maximum value of Δs for a loaded sample drawer may be denoted $\Delta s_{max}$. The maximum allowable value of $\Delta s_{max}$ may be set by the geometry of the tube cell 406 and the sample retainers. (4) The tube cell 406 may not contact the sample 414 in normal operation (sample extraction and analysis setup) as this may cause damage to an irreplaceable sample 414. Therefore, the tube cell 406 may not be able to move below a certain threshold. This safety threshold will be referred to as $\delta_{Safety}$, wherein $\delta_{Safety} > \Delta s_{max}$. (5) The operating distance between the bottom of the tube cell 416 and the sample 414 may be greater than $\delta_{Safety}$. The default starting operating position may allow for a significant amount of travel during the Z' tuning process. The operating distance may be referred to as δ. Therefore, the default value of δ may be $\delta = 2(\delta_{Safety})$.

Figure 25:
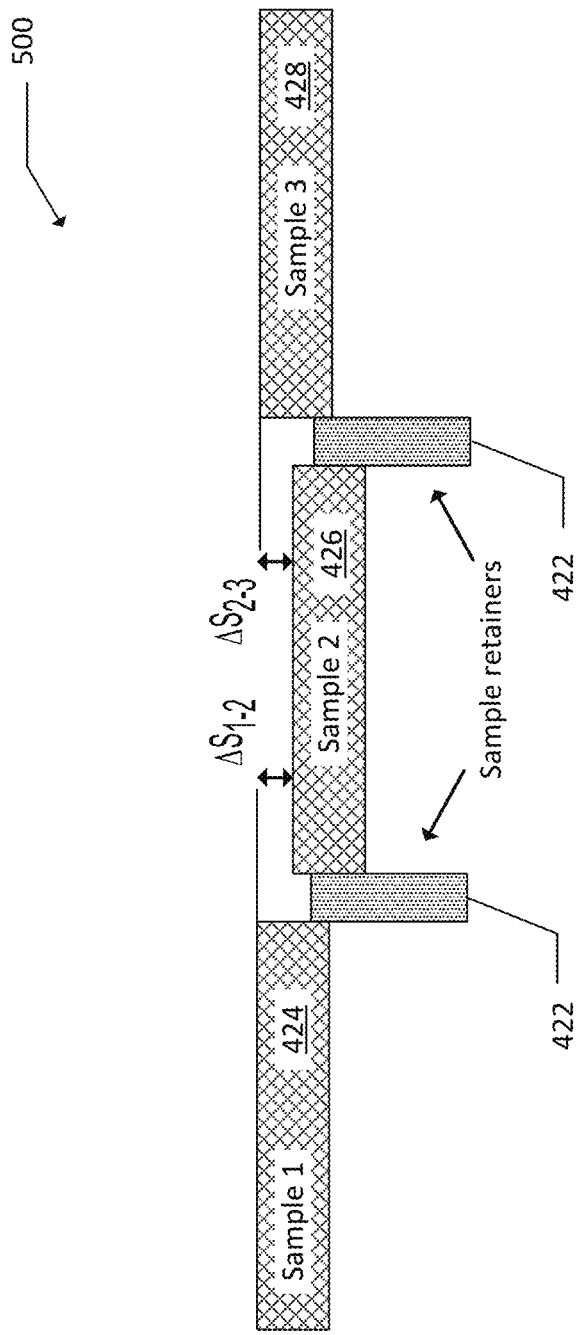
FIG. 25 is an example block diagram of the height difference between consecutive samples to be analyzed by a device for dynamically varying the extraction distance between the extraction volume and the sample surface, according to one aspect of the present disclosure.
Figure 26:
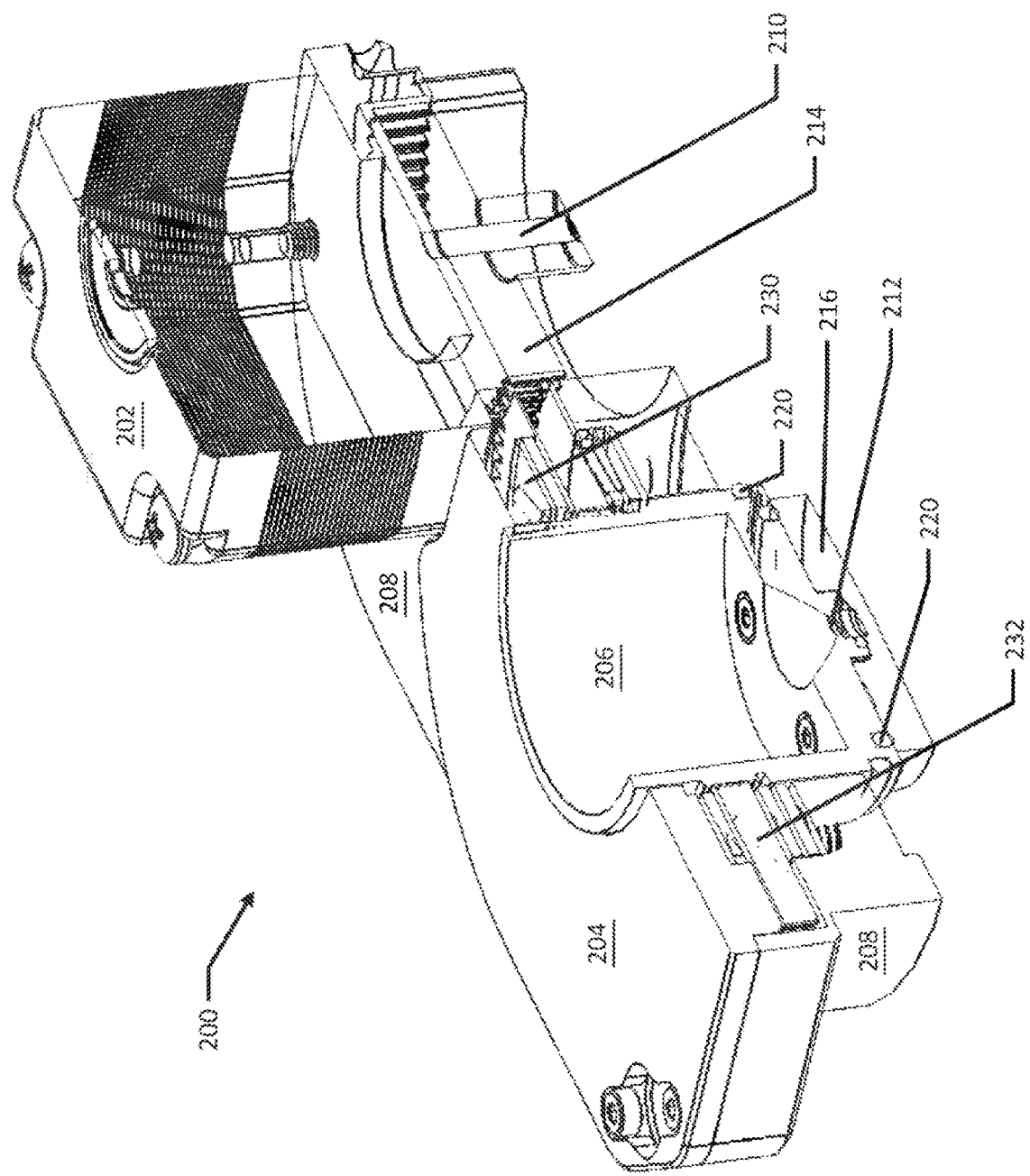
FIG. 26 is an example cross-section of a device for dynamically varying the extraction distance between the extraction volume and the sample surface, according to one aspect of the present disclosure.
Figure 27:
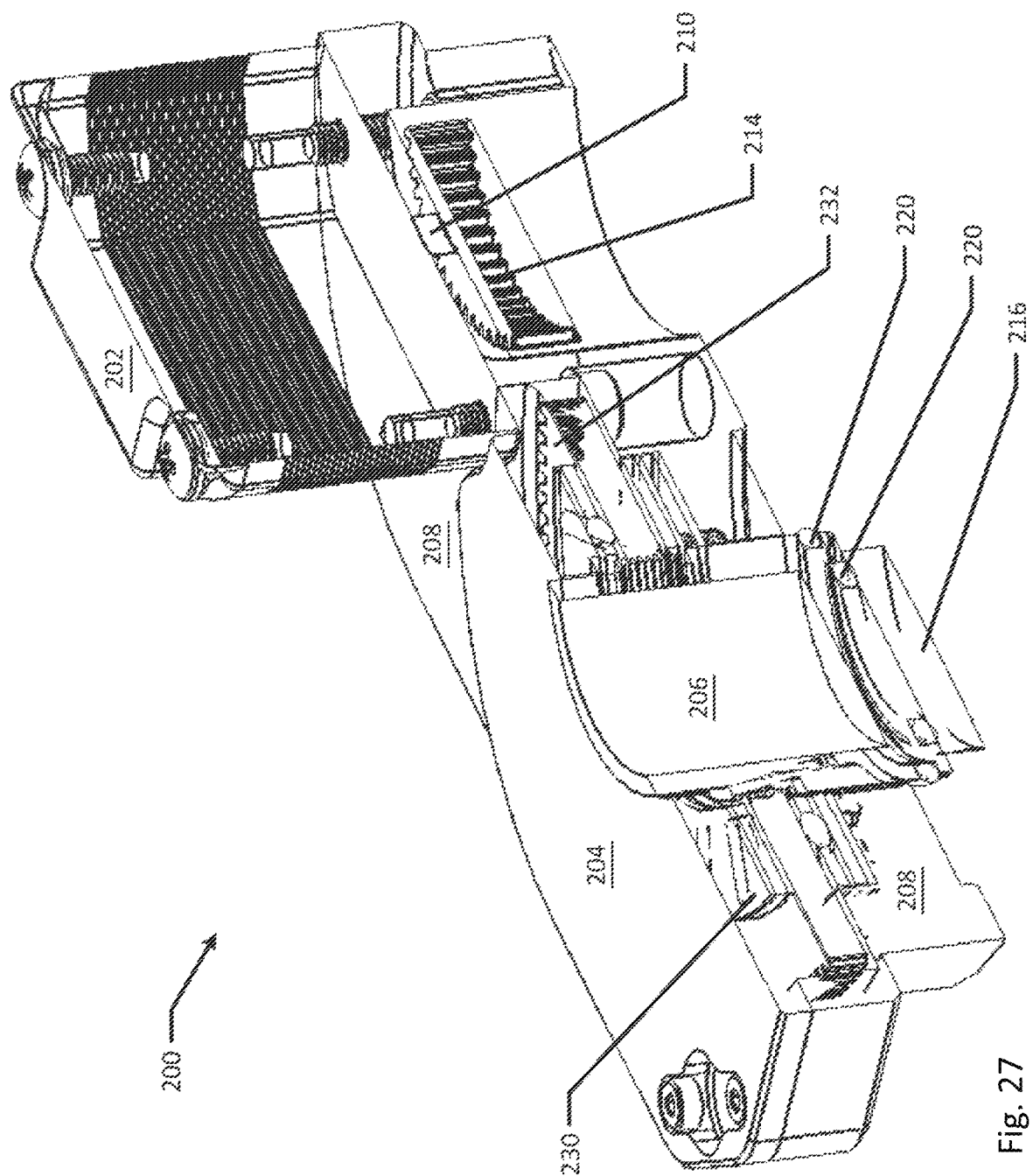
FIG. 27 is an example cross-section of a device for dynamically varying the extraction distance between the extraction volume and the sample surface, according to one aspect of the present disclosure.

FIG. 25 may depict an example 500 of calculating the height difference between different samples, according to an example of the present disclosure. FIG. 25 depicts sample one 424, sample two 426, and sample three 428 separated by sample retainers 422. In the example, the variation between the heights of sample one 424 and sample two 426 is $\Delta s_{1-2}$. In the example, the height variation between sample two 426 and sample three 428 is $\Delta s_{2-3}$.

The Z' axis may be calibrated to account for the above listed assumptions. An example of the calibration process may be outlined in FIGS. 14A-F and FIG. 15. The calibration process may establish relationships between an objective lens, which may be a part of the laser/video beam-combiner assembly mounted on the Z axis stage, and the tube cell mounted which may be located on the Z' axis stage and the sample 414. This calibration may be conducted as frequently as desired. Typical reasons for calibration may be when something happens that may change the relative home positions of the two moving elements, such as, for example, service of the Z' or Z axes, adjustments to the video focal plane, etc. Although these may be typical examples of when calibration is to occur, calibration may occur more often or for many other reasons than those listed herein.

Figure 15:
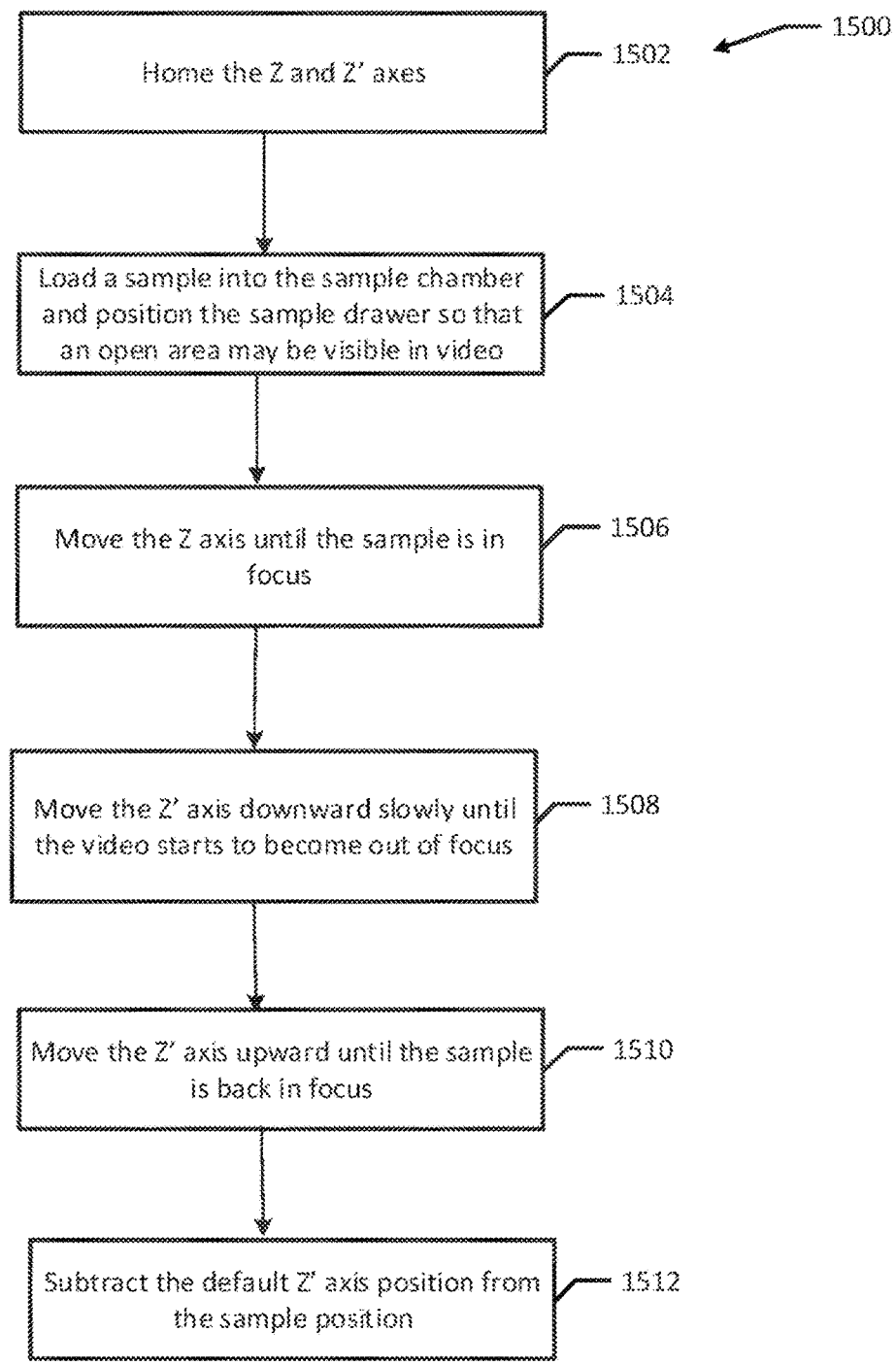
FIG. 15 is a logic flow diagram illustrating an example method for calibrating a device for dynamically varying the extraction distance between the extraction volume and the sample surface, according to one aspect of the present disclosure.

FIG. 15 is an example method for calibrating a device for dynamically varying the extraction distance between the extraction volume and the sample surface, according to one aspect of the present disclosure. Although the example method 1500 is described with reference to the logic flow diagram illustrated in FIG. 15, it will be appreciated that many other methods of performing the acts associated with the method may be used. For example, the order of some of the processes may be changed, certain processes may be combined with other processes, and some of the processes described are optional.

The method 1500 begins by homing 1502 the Z and Z' axes. For example, the Z' axis may stay at the top of its travel distance at the end of the homing process. This example step may be similar to FIG. 14A but without sample 414 loaded in the chamber. It will be appreciated that the homing 1502 process may be optional.

Next, a sample is loaded 1504 into the sample chamber, and the sample drawer is positioned so that an open area is visible in video. For example, the sample may be placed in a sample drawer to be loaded into the sample chamber. The sample drawer may be a special calibration drawer. The sample drawer may be positioned such that an open area on a glass slide or a specific calibration location is visible in the video. For example, as seen in FIG. 14A, the coaxial laser and video beam 404 has not yet reached the tube cell 406, and the tube cell 406 is located at Z' home 402. However, unlike in block 1502, in block 1504 the sample 414 is loaded in to the sample chamber. The line below the sample 414 is Z' limit 420. Line 408 is $\delta_{Safety}$. Samples may be loaded into the sample chamber on slides. Typically, slides may be 25, 25.4, 28, or 30 mm wide. However, any size slide may be used.

Next, the Z axis is moved 1506 until the sample is in focus. For example, in FIG. 14B the coaxial laser and video beam 404 is moved downward to make a laser and video focus point 418 on the sample 414.

Next, the Z' axis is moved 1508 downward slowly until the video starts to become out of focus. For example, in FIG. 14C, the tube cell 406 is moved downwards until the sample 414 becomes out of focus again. In the example, this ensures that the tube cell 406 has come in contact with the sample 414, and that it has started to move the sample 414 downward.

Next, the Z' axis is moved 1510 upward until the sample is back in focus. For example, in FIG. 14D, the Z' axis (tube cell 406) may slowly be brought upward until the sample 414 is back in focus. The Z' axis's (tube cell 406) position may denote the top of the sample 414.

Next, the default Z' axis position is subtracted 1512 from the sample position. For example, in FIG. 14E, the default $\delta$ Z' axis (tube cell 406) position is subtracted from the sample position. This difference is the default operating position of the tube cell 406 with respect to the sample 414 and may be optimized later during the tuning process, as discussed later. As seen in example FIG. 14E, line 410 may represent either the default Z' axis position or the newly subtracted position that will later be fine tuned. As depicted in FIG. 14F, the Z' axis (tube cell 406) may be returned back to its home position to avoid any risk of colliding with sample 414, or any other samples. Further, in the example, following calibration, the coordinate system may be transformed from the absolute reference frame ($\Delta Z'$) to the reference frame relative to the sample ($\delta$). $\delta$ may be $\delta = \Delta Z'_{sample} - \Delta Z'$, and therefore $\delta > 0$ when in normal operation.

Since Z' axis may home upward, or away from the sample, the position of home may be the farthest that the tube cell may be above the sample. The position of a location below home may be referred to as $\Delta Z'$ in units of motor counts, or stepper motor steps. During the calibration procedure, the $\Delta Z'$ position where the tube cell comes in contact with the sample may be found. In order to transform this value into a meaningful measurement to the user, a new reference frame may be defined with respect to the sample. The relative position of the bottom of the tube cell over sample is defined as $\delta = \Delta Z'_{sample} - \Delta Z'$. Therefore, when the tube cell may be contacting the sample during calibration $\delta$ may be equal to 0. Similarly, $\delta_{Safety}$ may be $\delta_{Safety} > 0$, since it may be in terms of this transformed coordinate system. Any time the user may adjust or read the position of the tube cell, the software may present the position in the $\delta$ reference frame.

Figure 16:
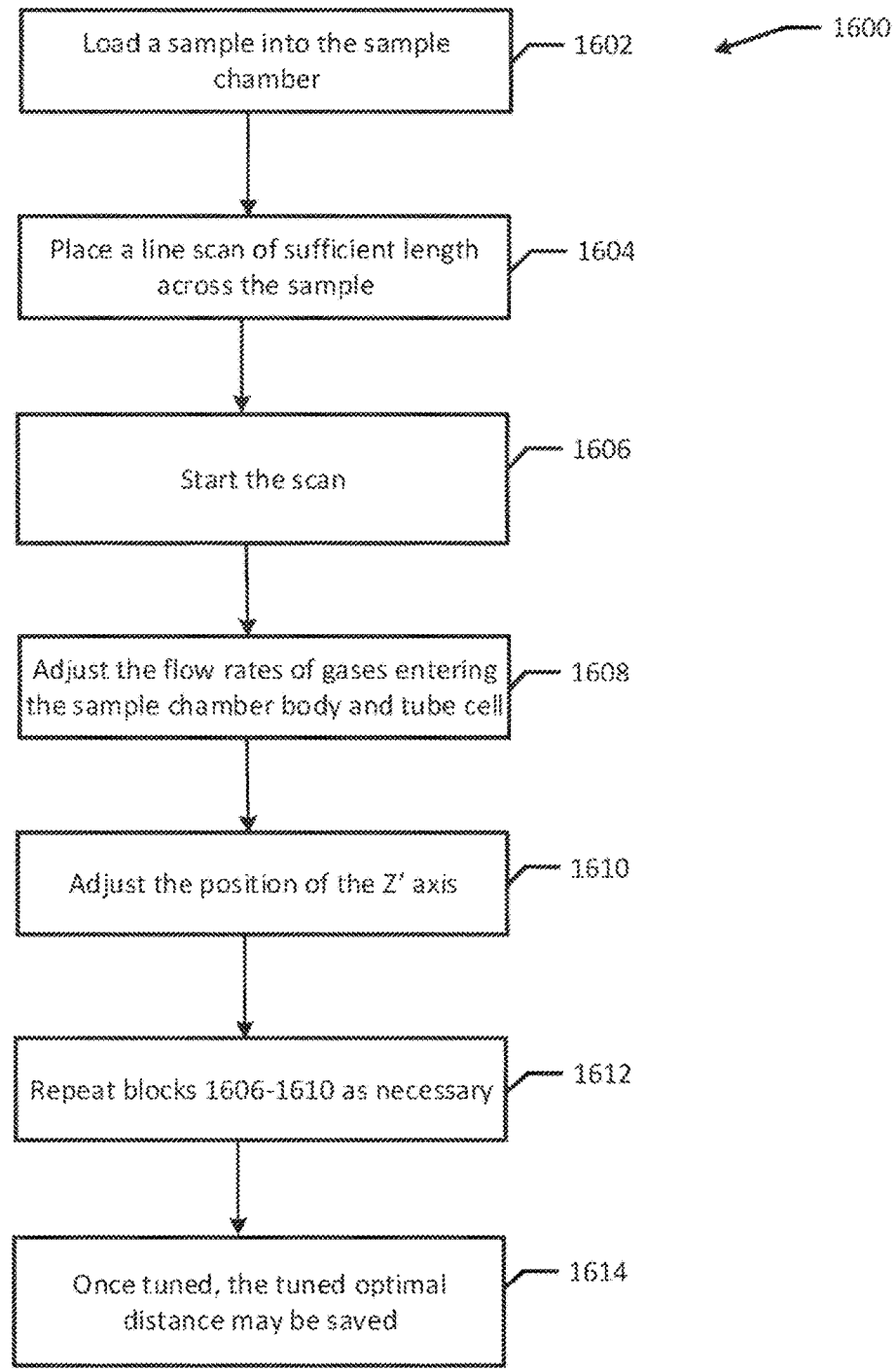
FIG. 16 is a logic flow diagram illustrating an example method for tuning a device for dynamically varying the extraction distance between the extraction volume and the sample surface, according to one aspect of the present disclosure.

FIG. 16 is an example method for tuning a device for dynamically varying the extraction distance between the extraction volume and the sample surface, according to one aspect of the present disclosure. Although the example method 1600 is described with reference to the logic diagram illustrated in FIG. 16, it will be appreciated that many other methods of performing the acts associated with the method may be used. For example, the order of some of the processes may be changed, certain processes may be combined with other processes, and some of the processes described are optional.

The method 1600 begins by loading 1602 a sample into a sample chamber. Next, a line scan of sufficient length is placed 1604 across the sample. Next, the scan is started 1606. For example, X, Y, Z stages may move to the starting position and the Z' axis may move downward to the default $\delta$ position. In the example, the laser may begin to fire, starting the tuning process.

Next, a flow rate of gases entering the sample chamber body and tube cell may be adjusted 1608. For example, flow rates of helium entering the sample chamber body and the tube cell may be adjusted for the optimal performance of the mass spectrometer.

Next, the position of the Z' axis is adjusted 1610. For example, the position of the Z' axis may be adjusted to optimize washout performance. Negative effects exerted on the spatial resolution of an image and/or sample throughput may be governed by the time window in which a detectable pulse response may be still present in the detector component of the analysis apparatus (referred to as "washout time" or "washout").

Next, processes 1606 to 1610 are repeated 1612 as necessary. For example, these processes may be repeated as necessary to optimize performance. Next, once tuned, the tuned optimal distance will be saved 1614. For example, once tuned, the new value of δ may be saved in software. Additionally, the Z' axis may return to the home position.

Figure 17:
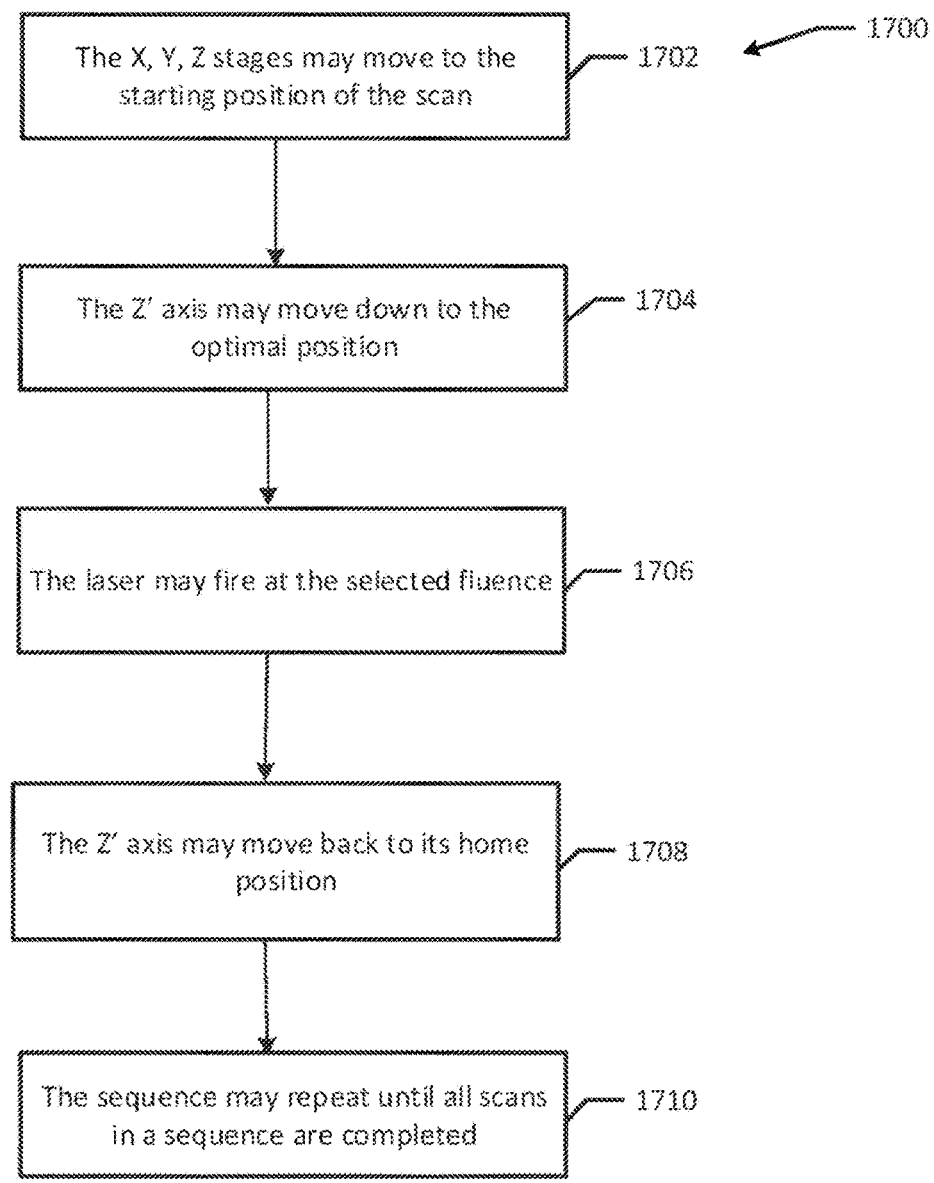
FIG. 17 is a logic flow diagram illustrating an example method for running a scan sequence for a device for dynamically varying the extraction distance between the extraction volume and the sample surface, according to one aspect of the present disclosure.
Figure 18:
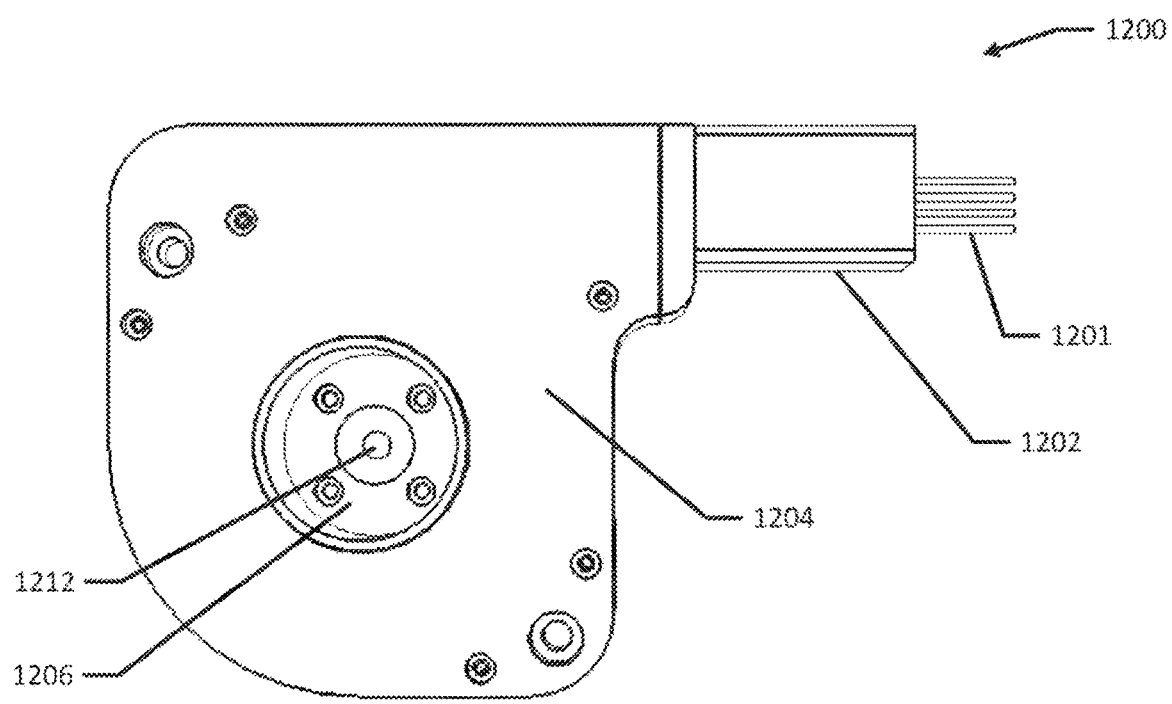
FIG. 18 is a top-down view of an alternate embodiment of a device for dynamically varying the extraction distance between the extraction volume and the sample surface, according to one aspect of the present disclosure.
Figure 19:
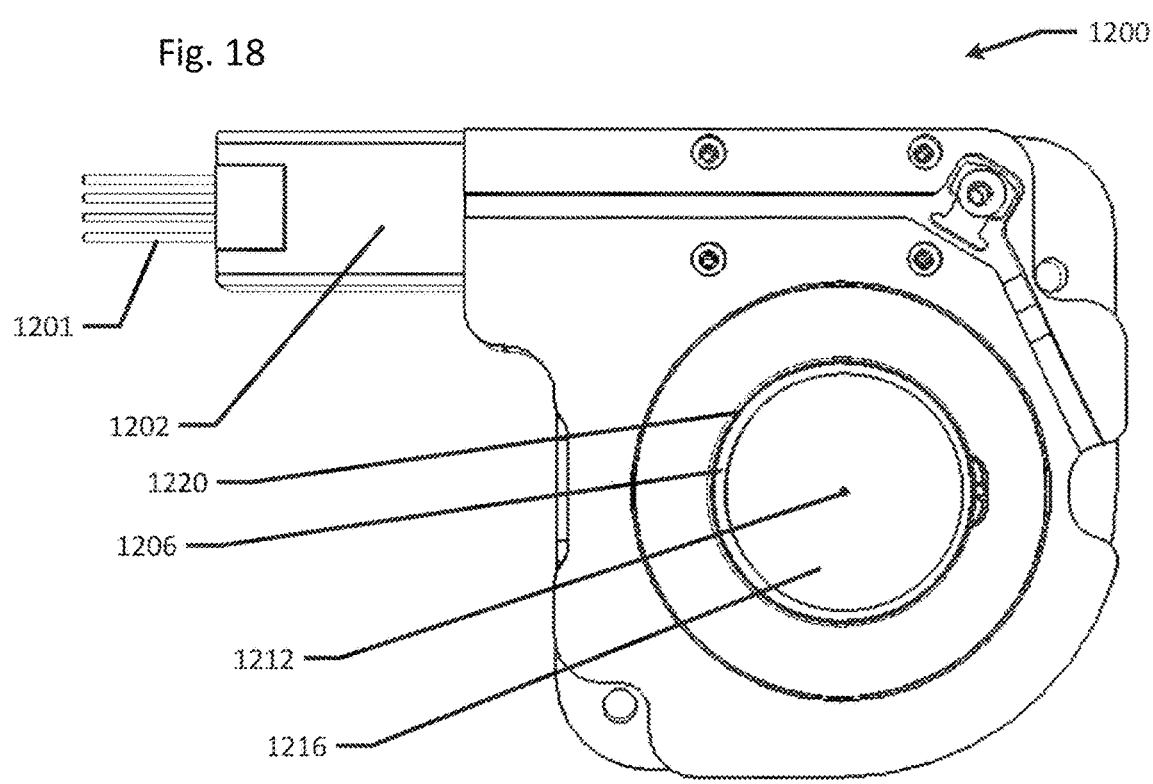
FIG. 19 is a bottom-up view of an alternate embodiment of a device for dynamically varying the extraction distance between the extraction volume and the sample surface, according to one aspect of the present disclosure.
Figure 20:
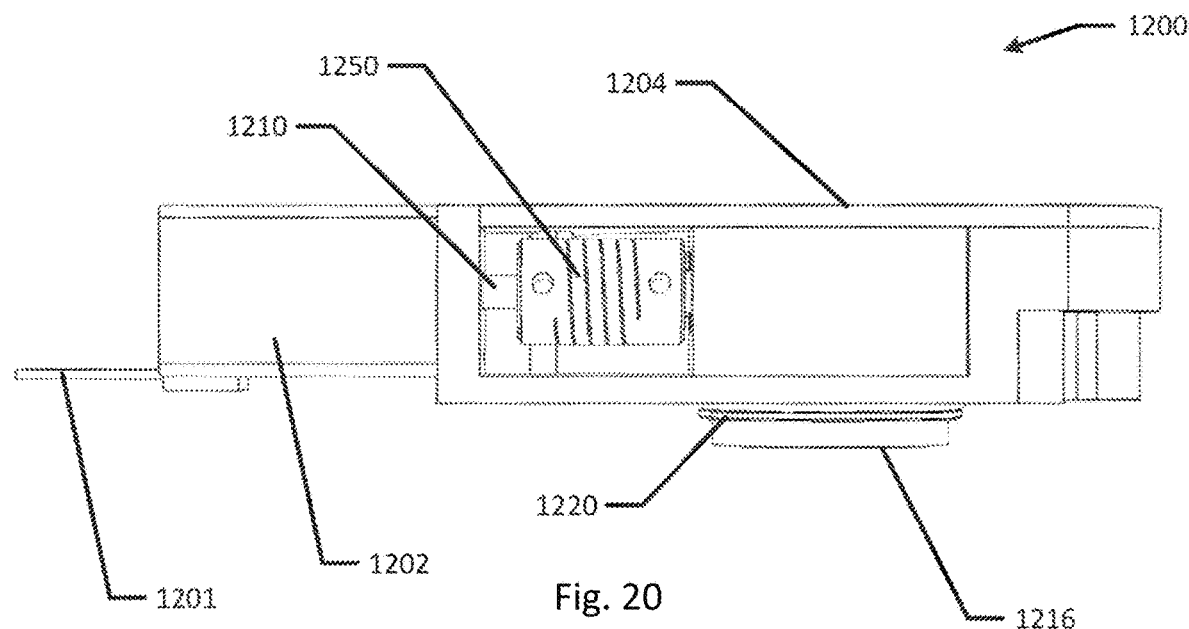
FIG. 20 is a side view of an alternate embodiment of a device for dynamically varying the extraction distance between the extraction volume and the sample surface, according to one aspect of the present disclosure.
Figure 21:
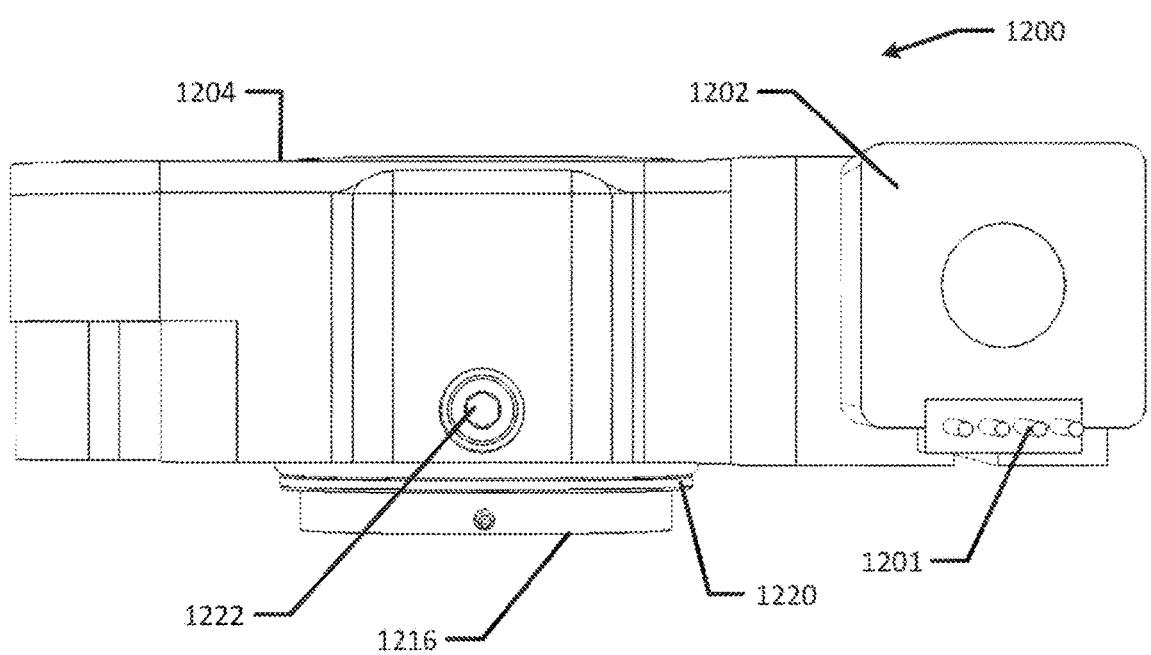
FIG. 21 is a back view of an alternate embodiment of a device for dynamically varying the extraction distance between the extraction volume and the sample surface, according to one aspect of the present disclosure.
Figure 22:
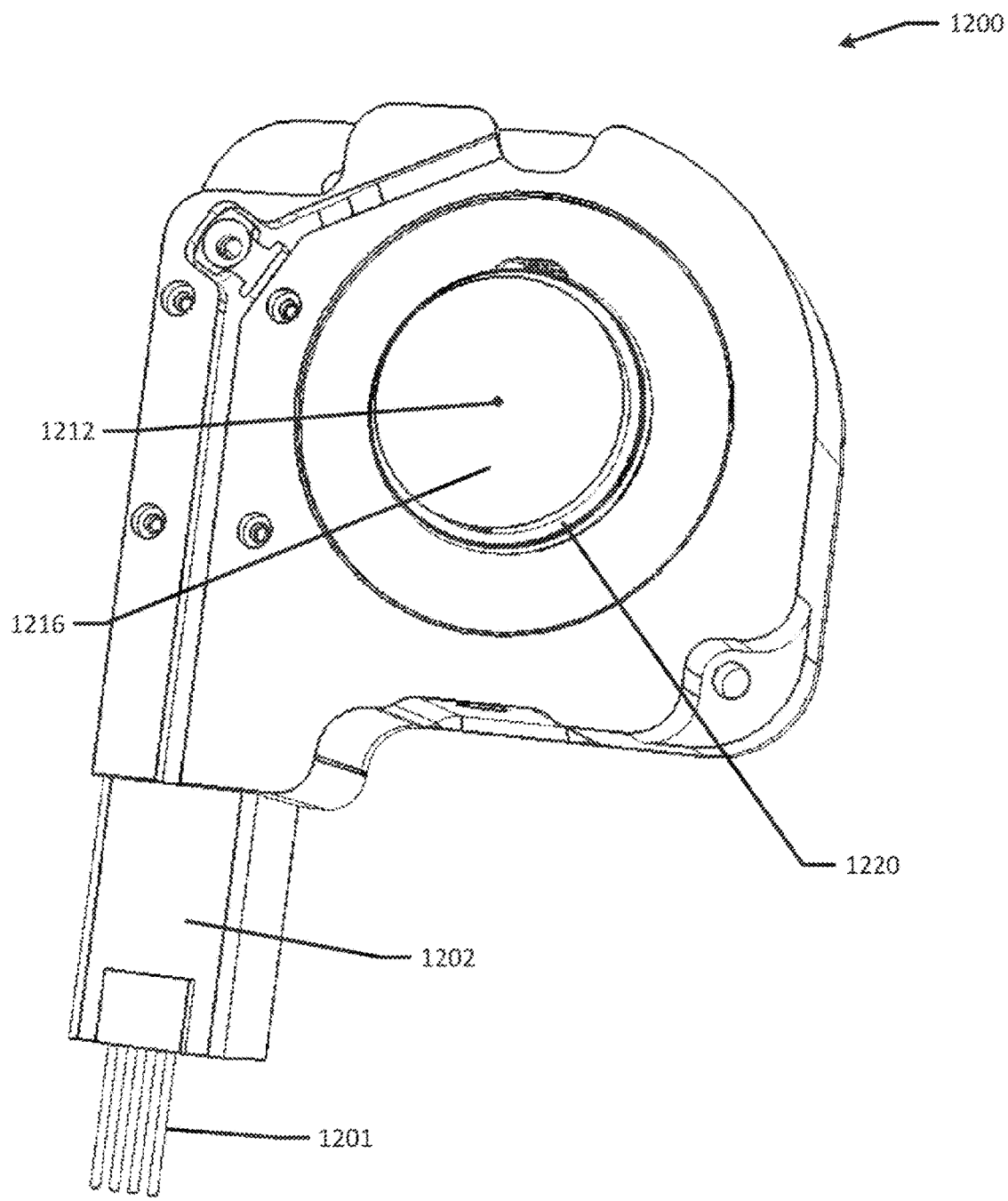
FIG. 22 is a perspective view of an alternate embodiment of a device for dynamically varying the extraction distance between the extraction volume and the sample surface, according to one aspect of the present disclosure.
Figure 23:
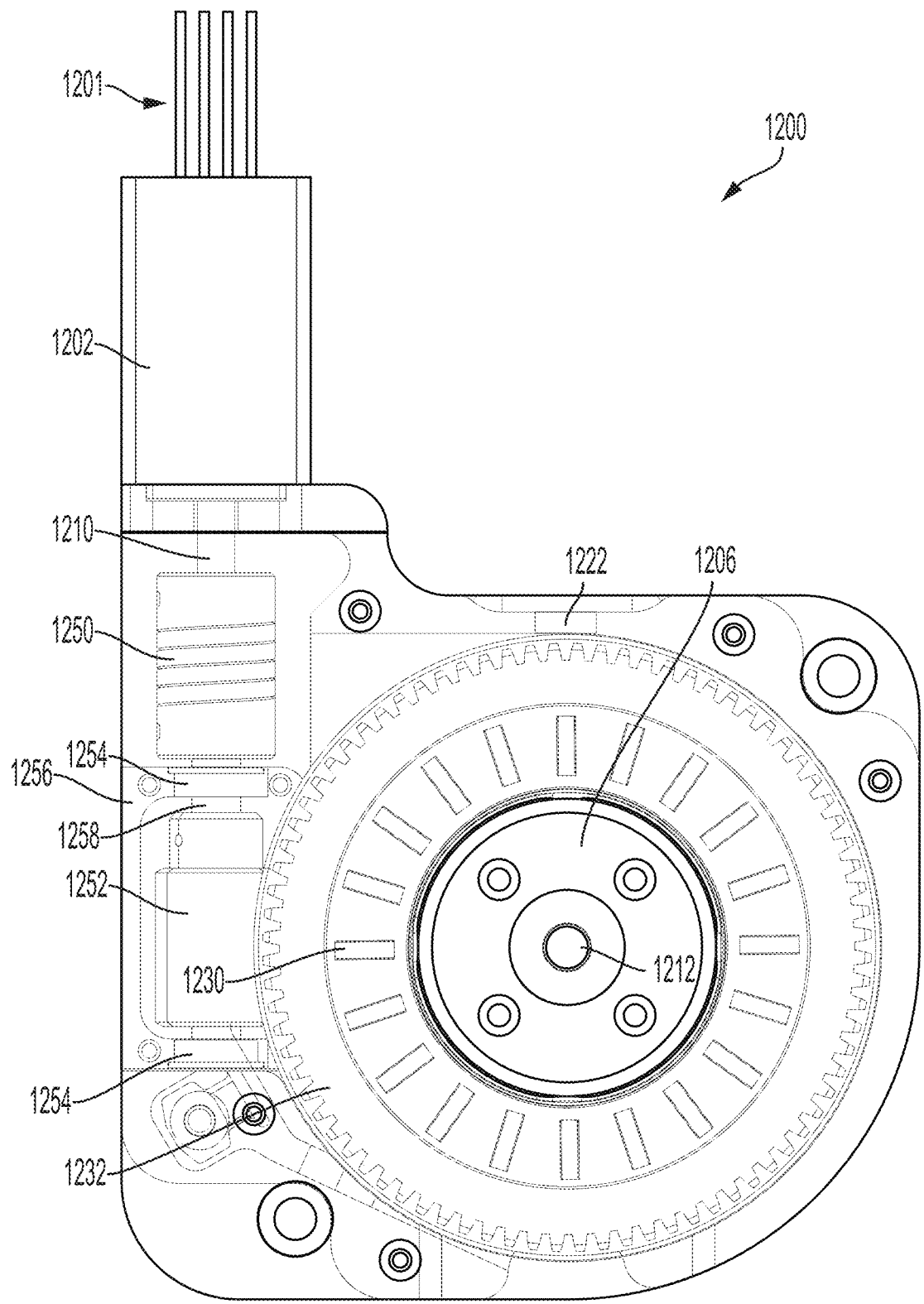
FIG. 23 is a top-down view of an alternate embodiment of a device for dynamically varying the extraction distance between the extraction volume and the sample surface with the adjustable piston cover hidden, according to one aspect of the present disclosure.
Figure 24:
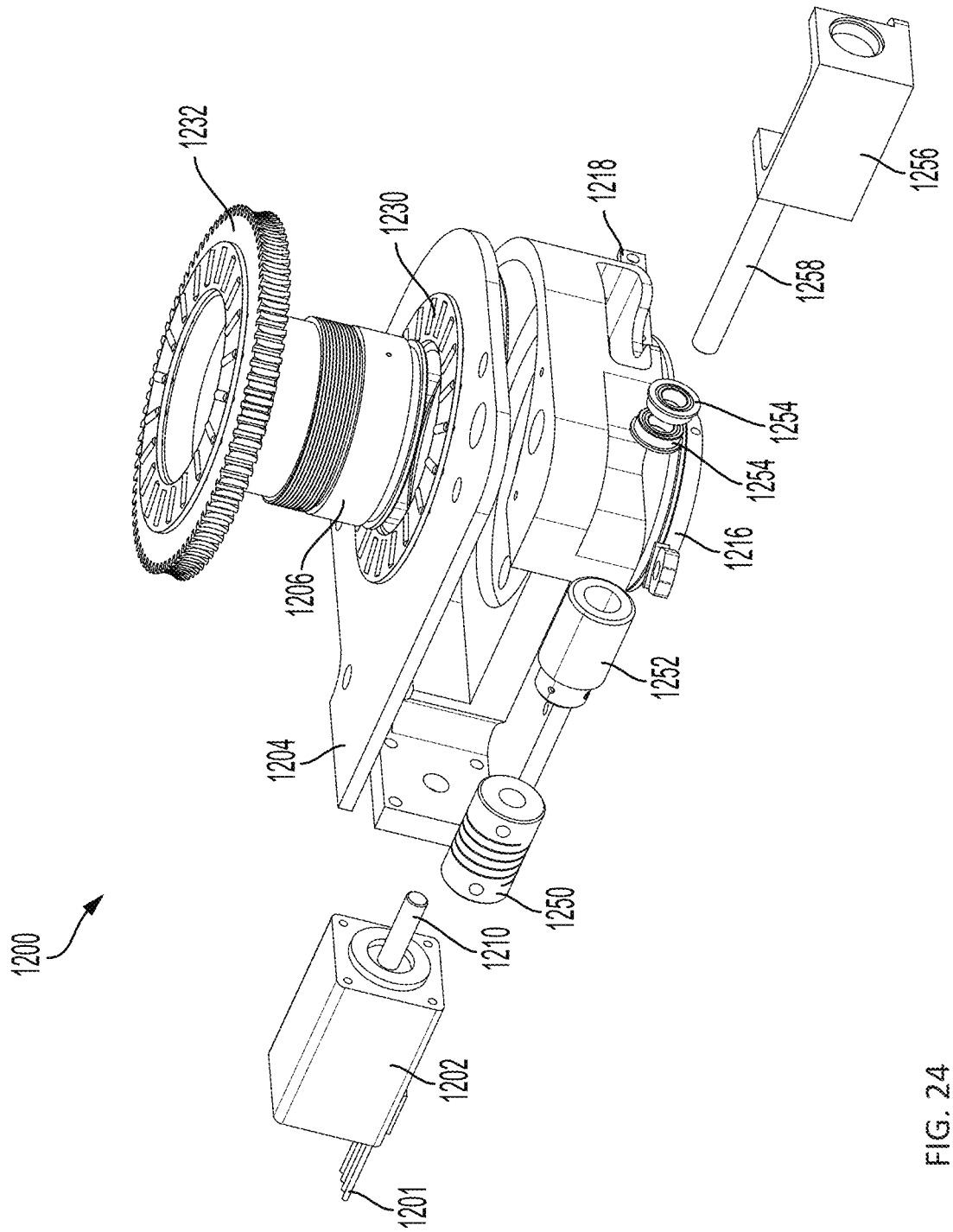
FIG. 24 is a perspective, exploded view of an alternate embodiment of a device for dynamically varying the extraction distance between the extraction volume and the sample surface, according to one aspect of the present disclosure.

FIG. 17 is an example method for running a scan sequence of a device for dynamically varying the extraction distance between the extraction volume and the sample surface, according to one aspect of the present disclosure. Although the example method 1700 is described with reference to the logic flow diagram illustrated in FIG. 17, it will be appreciated that many other methods of performing the acts associated with the method may be used. For example, the order of some of the processes may be changed, certain processes may be combined with other processes, and some of the processes described are optional.

The method 1700 begins by X, Y, Z stages moving 1702 to a starting position of the scan. Next, the Z' axis may move 1704 down to an optimal position. For example, the Z' axis may move down to the $\delta_{ops}$ (or optimal) position.

Next, the laser may fire 1706 at a selected fluence. Further, for example, if applicable, the X, Y, Z stages may continue to move while the laser fires at the selected repetition rate. The Z' axis may move in the same direction and distance as the Z axis. This may maintain the set 6 distance from the laser/video focal point which may be on the top surface of the sample) and the bottom of the tube cell throughout the scan.

Next, the Z' axis may move 1708 back to a home position. For example, once the scan is completed the Z' axis may move back to its home position. Next, the sequence may repeat 1710 until all scans in a sequence are completed. For example, the sequence of processes outlined in 1702 to 1708 may be repeated 1710 until all scans are completed.

FIGS. 18 to 24 disclose various example views of an alternate example of a device 1200 for dynamically varying the extraction distance between the extraction volume and the sample surface, according to one aspect of the present disclosure. FIGS. 18-24 may include a motor 1202. The motor 1202 is configured to receive power through wires 1201, which may be attached to an external power source for providing power to the motor 1202. The motor 1202 can also include a shaft 1210 extending from the motor 1202, which is configured to rotate in response to power being supplied to the motor 1202.

Similar to device 200, device 1200 can include a tube cell piston 1206, an adjustable piston cover 1204, a tube cell 1216, an O-ring 1220, a piston clocking screw 1222, and a window 1212 located within the tube cell piston 1206 and/or tube cell 1216. A limit switch board 1218 may be located within the device 1200 for limiting travel of the tube cell piston 1206 relative to the tube cell 1216. A limit switch may be a switch operated by the motion of a machine part. The example device may include Hall Effect sensors, magnets, sample drawers, spacers, doors, airlocks, sample chambers, position sensors, encoders, screws, cable ties, etc. The components described herein should not limit the components depicted in the figures, as more components may be disclosed in the figures than described. Further, all components described herein or depicted in FIGS. 18-24 may be either electrically or mechanically coupled and/or in electrical or mechanical communication with each other.

In addition to the features described above, FIGS. 18-24 may include a spur gear 1232 and a thrust needle-roller bearing 1230. The spur gear 1232 can include outer threads configured to mesh with a worm gear 1252, described in more detail below, and inner threads configured to mesh with threads on the tube cell piston 1206. Rotation of the spur gear 1232 causes the tube cell piston 1206 to upwardly or downwardly displace within the device 1200 relative to the tube cell 1216 based on the direction of rotation of the spur gear 1232.

As described above, the device 1200 can include a worm gear 1252 configured to mesh with the outer threads of the spur gear 1232. The worm gear 1252 can be supported within a carriage 1256 within the device 1200. A drive shaft 1258 can extend through the carriage 1256 and the worm gear 1252. A pin can be used to couple the worm gear 1252 to the drive shaft 1258 such that rotation of the drive shaft 1258 causes a complementary rotation of the worm gear 1252. While a pin can be used to accomplish the coupling of the worm gear 1252 to the drive shaft 1258, any other suitable means of coupling the worm gear 1252 to the drive shaft 1258 can be used. Bearings 1254 can positioned on both sides of the worm gear 1252 along the drive shaft 1258 and be positioned within apertures of the carriage 1256 to support the worm gear 1252. As mentioned above, rotation of the drive shaft 1258 causes rotation of the worm gear 1252 within the carriage 1256.

The device 1200 may also include a coupler 1250. The coupler is configured to couple the shaft 1210 of the motor 1202 to the drive shaft 1258. When coupled, rotation of the shaft 1210, by way of the motor 1202, cause rotation of the coupler 1250, which causes rotation of the drive shaft 1258, which causes rotation of the worm gear 1252.

In operation, a user may provide power to the motor 1202 by way of the wire 1201. Power can be provided to the motor 1202 in response to inputs from a user. As described above, rotation of the shaft 1210 of the motor 1202 causes rotation of the worm gear 1252. As also described above, the worm gear 1252 is meshed with the outer threads of the spur gear 1232, while the inner threads of the spur gear 1232 are meshed with the tube cell piston 1206. A first input signal can effect rotation of the spur gear 1232 in a first direction, which can cause the tube cell piston 1206 to vertically displace within the device 1200 towards the tube cell 1216. A second input signal, such as a signal to rotate the shaft 1210 of the motor 1202 an opposite direction, can effect rotation of the spur gear 1232 in a second direction, which can cause the tube cell piston 1206 to vertically displace within the device 1200 away the tube cell 1216.

Figure 28:
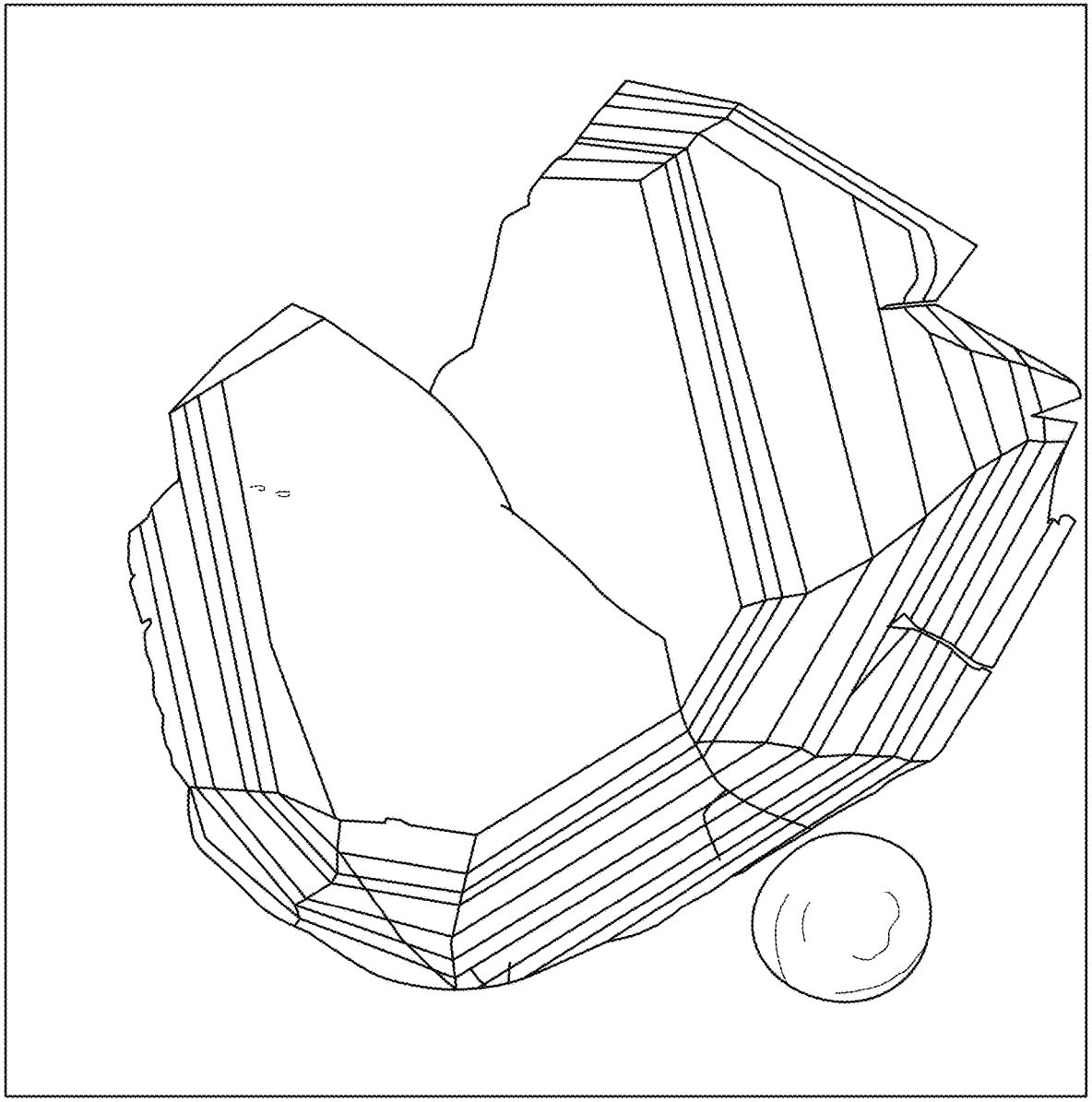
FIG. 28 is an image of a sample scanned with the device for dynamically varying the extraction distance between the extraction volume and the sample surface, according to one aspect of the present disclosure.

FIG. 28 is an image of a sample scanned with the device for dynamically varying the extraction distance between the extraction volume and the sample surface, according to one aspect of the present disclosure.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An apparatus for dynamically varying an extraction distance between an extraction volume and a sample surface, the apparatus comprising:
    a motor;
    a height adjustable stage having a threaded exterior surface;
    a spur gear surrounding the height adjustable stage, the spur gear having external teeth and internal threads, wherein the internal threads are mechanically coupled to the threaded exterior surface, and wherein the spur gear is mechanically coupled to the motor;

a probe assembly comprising a collection cell, wherein the probe assembly is operably coupled to the height adjustable stage;

a processor coupled to the motor; and a memory coupled to the processor, the memory storing machine executable instructions that, when executed by the processor, cause the processor to:

actuate the motor to move the probe assembly by a combination of the motor, the spur gear, and the height adjustable stage.

2. The apparatus of claim 1, wherein rotational motion of a shaft of the motor is translated to vertical linear motion of the analyte extraction device.

3. The apparatus of claim 1, wherein the processor is configured to receive inputs from a user.

4. The apparatus of claim 1, wherein the processor is configured to provide outputs to a user.

5. The apparatus of claim 4, wherein the outputs comprises a position of the probe assembly.

6. The apparatus of claim 1, further comprising a sample holder configured to hold a sample.

7. The apparatus of claim 6, wherein the sample holder comprises markings configured to help position the sample.

8. A system for dynamically varying an extraction distance between an extraction volume and a sample surface, the system comprising:

a device, comprising:

a motor;

a height adjustable stage having a threaded exterior surface;

a spur gear surrounding the height adjustable stage, the spur gear having external teeth and internal threads, wherein the internal threads are mechanically coupled to the threaded exterior surface, and wherein the spur gear is mechanically coupled to the motor;

a probe assembly comprising a collection cell, wherein the probe assembly is coupled to the height adjustable stage; and a moveable Z stage comprising an optical assembly; and a control system, comprising:

a processor operably coupled to the motor; and a memory operably coupled to the processor, wherein the memory comprises instructions that, when executed by the processor, cause the processor to:

actuate the motor to move the probe assembly down to an extraction position; and actuate the motor to move the probe assembly to a home position.

9. The system of claim 8, wherein rotation of a shaft of the motor vertically displaces the probe assembly.

10. The system of claim 8, wherein the control system is configured to receive inputs from a user.

11. The system of claim 8, wherein the processor is configured to provide outputs to a user.

12. The system of claim 11, wherein the outputs comprises a position of the probe assembly.

* * * * *